US011688179B2

(12) United States Patent
Sheu et al.

(10) Patent No.: US 11,688,179 B2
(45) Date of Patent: Jun. 27, 2023

(54) INFERRING INTENT USING COMPUTER VISION

(71) Applicant: Pony AI Inc., Grand Cayman (KY)

(72) Inventors: Kevin Sheu, Fremont, CA (US); Jie Mao, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 470 days.

(21) Appl. No.: 17/011,901

(22) Filed: Sep. 3, 2020

(65) Prior Publication Data

US 2022/0067408 A1 Mar. 3, 2022

(51) Int. Cl.
| | | |
|---|---|---|
| *G06V 20/58* | (2022.01) | |
| *G06N 5/04* | (2023.01) | |
| *G06N 20/00* | (2019.01) | |
| *G06T 7/11* | (2017.01) | |
| *G06T 11/20* | (2006.01) | |
| *G06F 18/24* | (2023.01) | |

(52) U.S. Cl.
CPC ............ *G06V 20/584* (2022.01); *G06F 18/24* (2023.01); *G06N 5/04* (2013.01); *G06N 20/00* (2019.01); *G06T 7/11* (2017.01); *G06T 11/20* (2013.01); *G06T 2210/12* (2013.01)

(58) Field of Classification Search
CPC ......... G06V 20/584; G06T 7/11; G06T 11/20; G06T 2210/12; G06N 20/00; G06N 5/04; G06F 18/24
See application file for complete search history.

(56) References Cited

U.S. PATENT DOCUMENTS

| | | | | |
|---|---|---|---|---|
| 10,486,707 | B2 * | 11/2019 | Zelman | G08G 1/096725 |
| 10,824,155 | B2 * | 11/2020 | Hong | B60W 30/045 |
| 11,003,928 | B2 * | 5/2021 | Littman | G06V 10/764 |
| 11,048,982 | B2 * | 6/2021 | Steelberg | G06F 18/285 |
| 11,126,873 | B2 * | 9/2021 | Lee | G06N 3/084 |
| 11,370,423 | B2 * | 6/2022 | Casas | G06N 20/00 |
| 11,527,078 | B2 * | 12/2022 | Littman | G06V 20/41 |
| 2017/0154529 | A1 * | 6/2017 | Zhao | G08G 1/07 |
| 2019/0180624 | A1 * | 6/2019 | Hassan-Shafique | G01S 17/86 |
| 2020/0073399 | A1 * | 3/2020 | Tateno | G05D 1/0221 |
| 2020/0410853 | A1 * | 12/2020 | Akella | G08G 1/04 |
| 2021/0182605 | A1 * | 6/2021 | Anthony | G06N 3/084 |
| 2021/0197720 | A1 * | 7/2021 | Houston | G06N 3/08 |
| 2021/0319252 | A1 * | 10/2021 | Ha | G06T 19/006 |
| 2022/0383620 | A1 * | 12/2022 | Yoo | G06F 18/25 |

\* cited by examiner

*Primary Examiner* — Manav Seth

(57) ABSTRACT

A system trains a model to infer an intent of an entity. The model includes one or more sensors to obtain frames of data, one or more processors, and a memory storing instructions that, when executed by the one or more processors, cause the system to perform steps. A first step includes determining, in each frame of the frames, one or more bounding regions, each of the bounding regions enclosing an entity. A second step includes identifying a common entity, the common entity being present in bounding regions corresponding to a plurality of the frames. A third step includes associating the common entity across the frames. A fourth step includes training a model to infer an intent of the common entity based on data outside of the bounding regions.

20 Claims, 22 Drawing Sheets

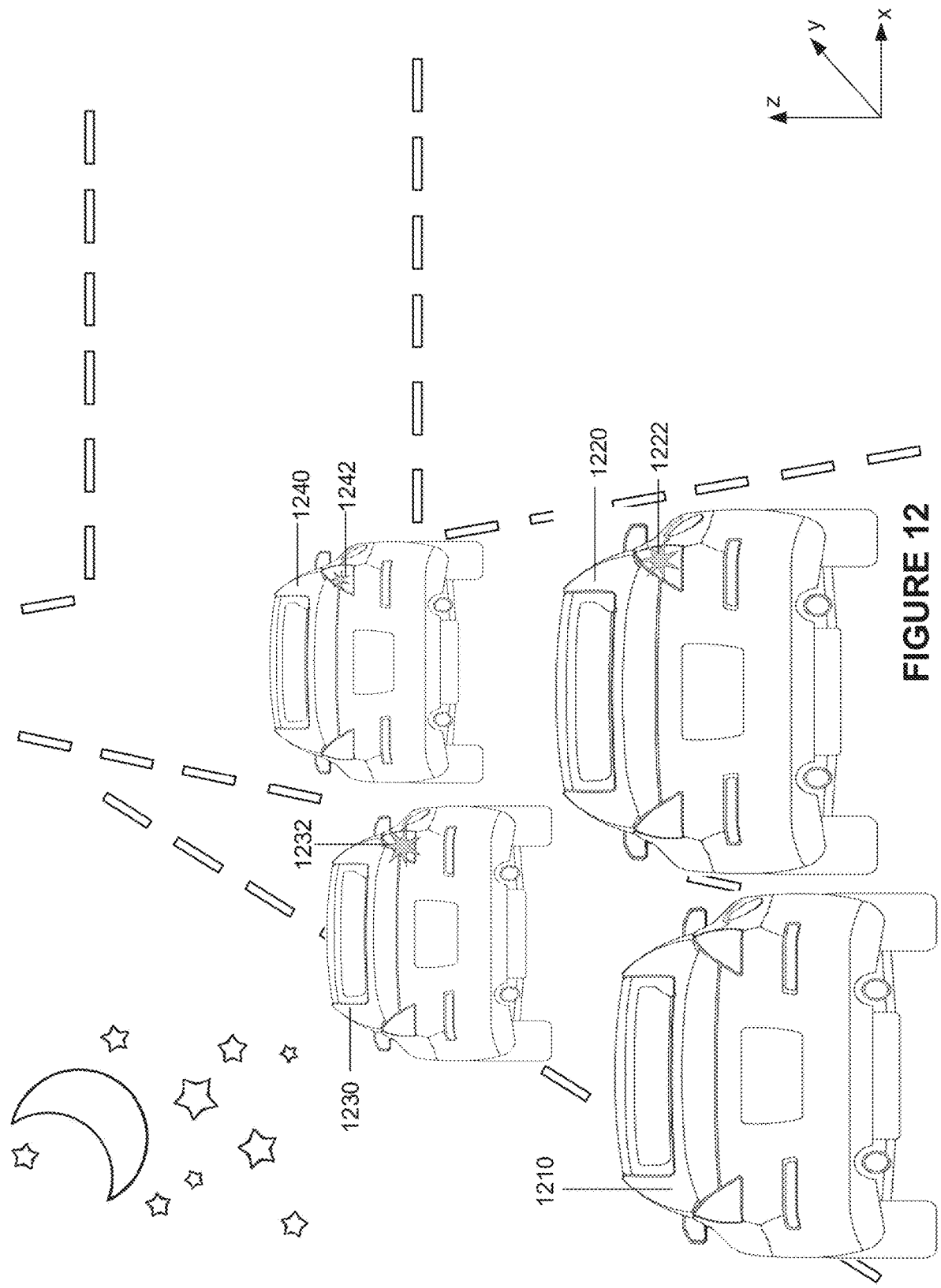

1600

Obtain frames of data using one or more sensors such as a camera or a Lidar 1602

Determine, in each frame of the frames, one or more bounding regions, each of the bounding regions enclosing an entity such as a vehicle or pedestrian 1604

Across the frames, identify a common entity, the common entity being present in bounding regions corresponding to a plurality of the frames 1606

Associate the common entity across the frames 1608

Using a trained model, infer an intent of the common entity based on data outside of the bounding regions 1610

FIGURE 16

INFERRING INTENT USING COMPUTER VISION

BACKGROUND

A vehicle such as an autonomous or semi-autonomous vehicle can include sensors that capture sensor data from a surrounding environment of the vehicle. For example, an autonomous or semi-autonomous vehicle can include cameras, light detection and ranging (LiDAR) sensors, radars, Global Positioning System (GPS) devices, sonar-based sensors, ultrasonic sensors, accelerometers, gyroscopes, magnetometers, inertial measurement units (IMUs), and far infrared (FIR) sensors. Using such sensor data, a processor on the vehicle can detect different objects or entities in the surrounding environment. In turn, the detection of these objects and entities can assist the vehicle in performing navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

SUMMARY

Described herein, in some embodiments, is a system configured to train a model to infer an intent of an entity. The system may comprise one or more sensors configured to obtain frames of data, one or more processors, and a memory storing instructions that, when executed by the one or more processors, cause the system to perform steps. The steps may comprise: determining, in each frame of the frames, one or more bounding regions, each of the bounding regions enclosing an entity; across the frames, identifying a common entity, the common entity being present in bounding regions corresponding to a plurality of the frames; associating the common entity across the frames; and training a model to infer an intent of or associated with the common entity based on data outside of the bounding regions.

In some embodiments, the training the model may be based on an output generated from an other model.

In some embodiments, the output generated from the other model comprises a segmentation output.

In some embodiments, the segmentation output comprises a semantic segmentation output or an instance segmentation output.

In some embodiments, the segmentation output comprises a semantic segmentation output that trains the model to predict a category or classification associated with one or more pixels of the frames. The one or more pixels may be outside or inside the bounding region.

In some embodiments, the segmentation output comprises an instance segmentation output that trains the model to predict whether two pixels associated with a common category or classification belong to same or different instances.

In some embodiments, the output generated from the other model comprises Lidar data.

In some embodiments, the instructions further cause the system to perform rescaling the output generated from the other model to fit dimensions of the bounding regions.

In some embodiments, the one or more sensors comprise a camera; the entity comprises a vehicle; and the intent is associated with a turning or braking maneuver of the vehicle.

In some embodiments, the intent is associated with a left or right turn signal.

In some embodiments, the training comprises training the model to determine a probability of a left turn signal of the vehicle being on, a probability of a right turn signal of the vehicle being on, and a probability of a brake light being on intent is associated with a left or right turn signal.

In some embodiments, the training is based on cross entropy losses over the inferred intent, over left or right turn signals of the vehicle, and over the vehicle.

In some embodiments, the training comprises training the model to infer the intent under different weather and lighting conditions.

In some embodiments, the training is based on a classification loss, a bounding box loss, and/or a mask prediction loss.

In some embodiments, the model comprises a Convolutional Neural Network-Long Short-Term Memory (CNN-LSTM) model.

In some embodiments, the model comprises a softmax layer that determines probabilities that each pixel of the frames belongs to a particular classification or category.

In some embodiments, a system may be configured to infer an intent of an entity. The system may comprise one or more sensors configured to obtain frames of data, one or more processors, and a memory storing instructions that, when executed by the one or more processors, cause the system to perform steps. The steps may comprise: determining, in each frame of the frames, one or more bounding regions enclosing one or more entities; across the frames, identifying a common entity out of the one or more entities, the common entity being present in bounding regions associated with a plurality of the frames; associating the common entity across the frames; and inferring, using a trained model, an intent of the common entity based on data outside of the bounding regions.

In some embodiments, the one or more sensors comprise a camera; and the instructions further cause the system to perform: determining a probability associated with the inferred intent; and in response to the probability being within a threshold range, supplementing the obtained frames with Lidar data.

In some embodiments, the inferring an intent of the common entity further comprises: categorizing or classifying one or more pixels outside of the bounding regions during a semantic segmentation process; out of the one or more pixels, determining second pixels having a common category or classification with one another; of the second pixels having the common category or classification, determining whether two of the second pixels belong to same or different instances in an instance segmentation process; and inferring the intent based on the semantic segmentation process and the instance segmentation process.

In some embodiments, the one or more sensors comprise a camera; the entity comprises a vehicle; and the intent is associated with a turning or braking maneuver of the vehicle.

In some embodiments, the inferring the intent comprises determining a probability of a left turn signal of the vehicle being on, a probability of a right turn signal of the vehicle being on, and a probability of a brake light being on.

Various embodiments of the present disclosure provide a method implemented by a system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 6-10, 11A-11B, and 12-13 illustrate exemplary training scenarios of training a model, such as the model described in the previous figures including FIG. 5, to infer intents of vehicles, in accordance with an example embodiment of the present disclosure.

FIG. 16 illustrates a flowchart of a prediction or inference method, in accordance with an example embodiment of the present disclosure.

DETAILED DESCRIPTION

Embodiments described in this application provide a scheme or method to train a model, such as a machine learning model, to infer or predict an intent of an entity, such as a vehicle or pedestrian, with markedly higher accuracy, precision, and recall. The model may be trained to predict a driving or navigation intent of a vehicle, such as, whether the vehicle intends to turn right, left, brake, or stop, by deciphering and analyzing a status of car indicator lights, including left and right turn signal lights, brake lights. The model may be fed sensor data that has been processed and/or annotated with bounding boxes that indicate boundaries of vehicles, pedestrians, and other entities. The model may be trained to further incorporate other contextual information outside the bounding boxes, including features and outputs from other machine learning networks and/or models in order to infer or predict an intent of an entity of interest. The contextual information may include segmentation data such as semantic segmentation data and instance segmentation data, and sensor data of different modalities such as Lidar data to enhance camera data.

Figure 1A:
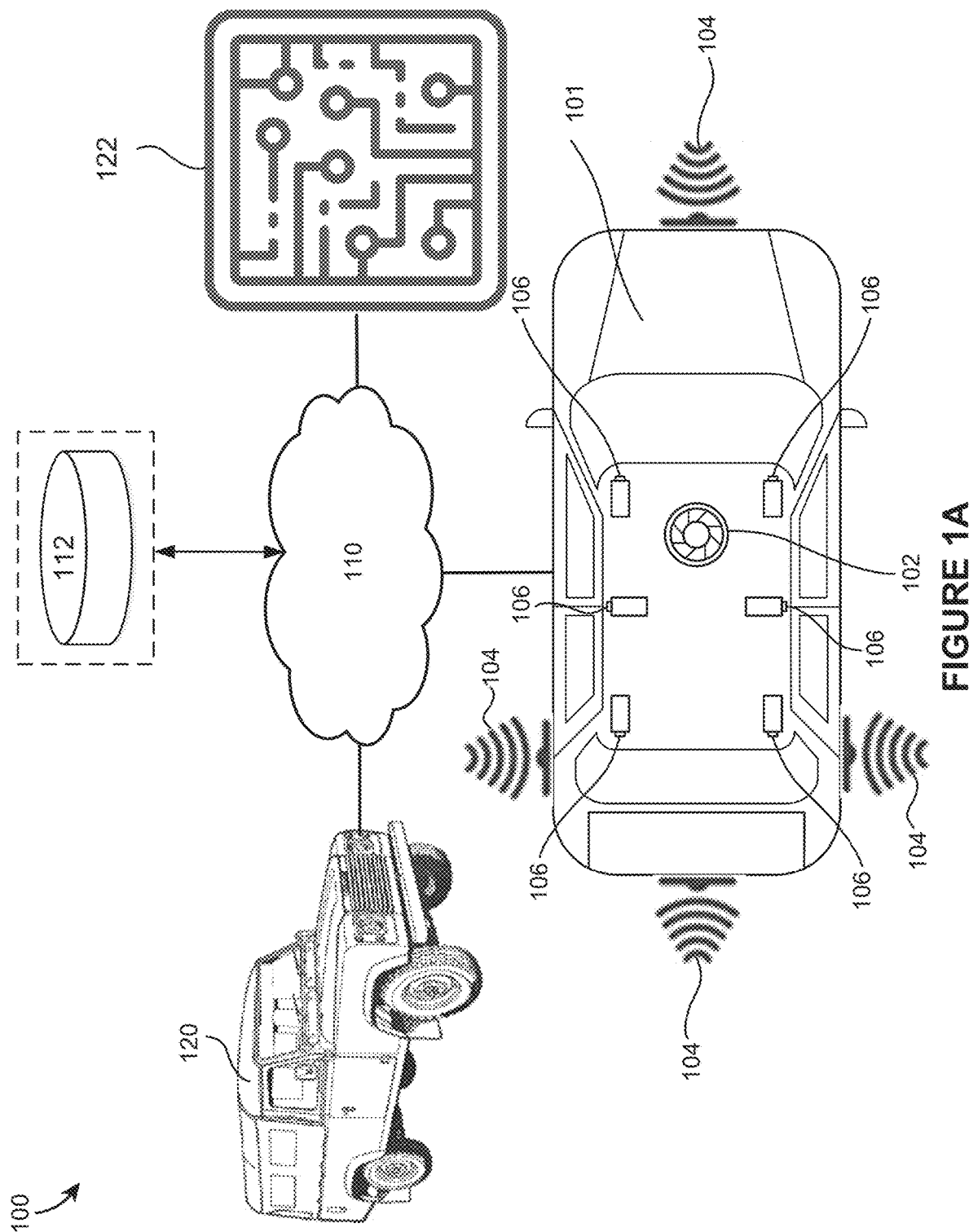
FIG. 1A illustrates an example environment of a system that trains a model to infer an intent of an entity such as a vehicle or a pedestrian, according to an embodiment of the present disclosure.

FIG. 1A illustrates an example environment 100 of a system that trains a model to infer an intent of an entity such as a vehicle or a pedestrian, according to an embodiment of the present disclosure. In FIG. 1A, a vehicle such as an autonomous vehicle 101 may include sensors such as Lidar sensors 102, radar sensors 104, cameras 106, GPS, sonar, ultrasonic, IMU (inertial measurement unit), accelerometers, gyroscopes, magnetometers, and FIR (far infrared) sensors to detect and identify objects in a surrounding environment. The sensor data may comprise pictorial or image data such as pictures or videos, audio data, audiovisual data, atmospheric data such as temperature, pressure, or elevation, captured in either real-time or with a time delay. For example, the Lidar sensors 102 can generate a three-dimensional map of the environment. The Lidar sensors 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs including speed limit, school zone, construction zone signs and traffic lights such as red light, yellow light, green light, and flashing red light. The vehicle 101 can also include myriad actuators to propel and navigate the vehicle 101 in the surrounding. Such actuators may include, for example, any suitable electromechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead in an adaptive cruise control mode. In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground such as cars, trucks, and busses, but may also include vehicles that travel in air such as drones, airplanes, and helicopters, vehicles that travel on water such as boats, and submarines. Further, "vehicle" or "vehicles" discussed in this paper may or may not accommodate one or more passengers therein. In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships between objects and the vehicle 101, detect and analyze road signs just as the human driver. Moreover, the vehicle 101 can perform more complex operations, such as parallel parking, parking in a crowded parking lot, collision avoidance, without any human input.

The environment 100 may also include one or more servers 112 accessible to a computing system 122. The one or more servers 112 may store sensor data from the vehicle 101, one or more sensors of other vehicles such as another vehicle 120, which may be an AV, one or more satellite maps, and/or one or more road sensors such as sensors on traffic lights. In some embodiments, the one or more servers 112 may store integrated or fused data from different modalities of sensors such as data from the radar sensors 104 and the cameras 106, and/or different sensors of a same modality. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the another vehicle 120. For example, the vehicle 101 may infer an intent of a third vehicle on a road and transmit the information or data of the intent of the third vehicle to the another vehicle 120. Such a situation may arise when the another vehicle 120 is unable to capture sensor data or generate bounding regions enclosing the third vehicle. The another vehicle 120 may acquire data from the vehicle 101, directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces. The computing system 122 may include one or more processors such as a graphics processing unit (GPU). The functions of the computing system 122 will be described further in the subsequent figures.

Figure 1B:
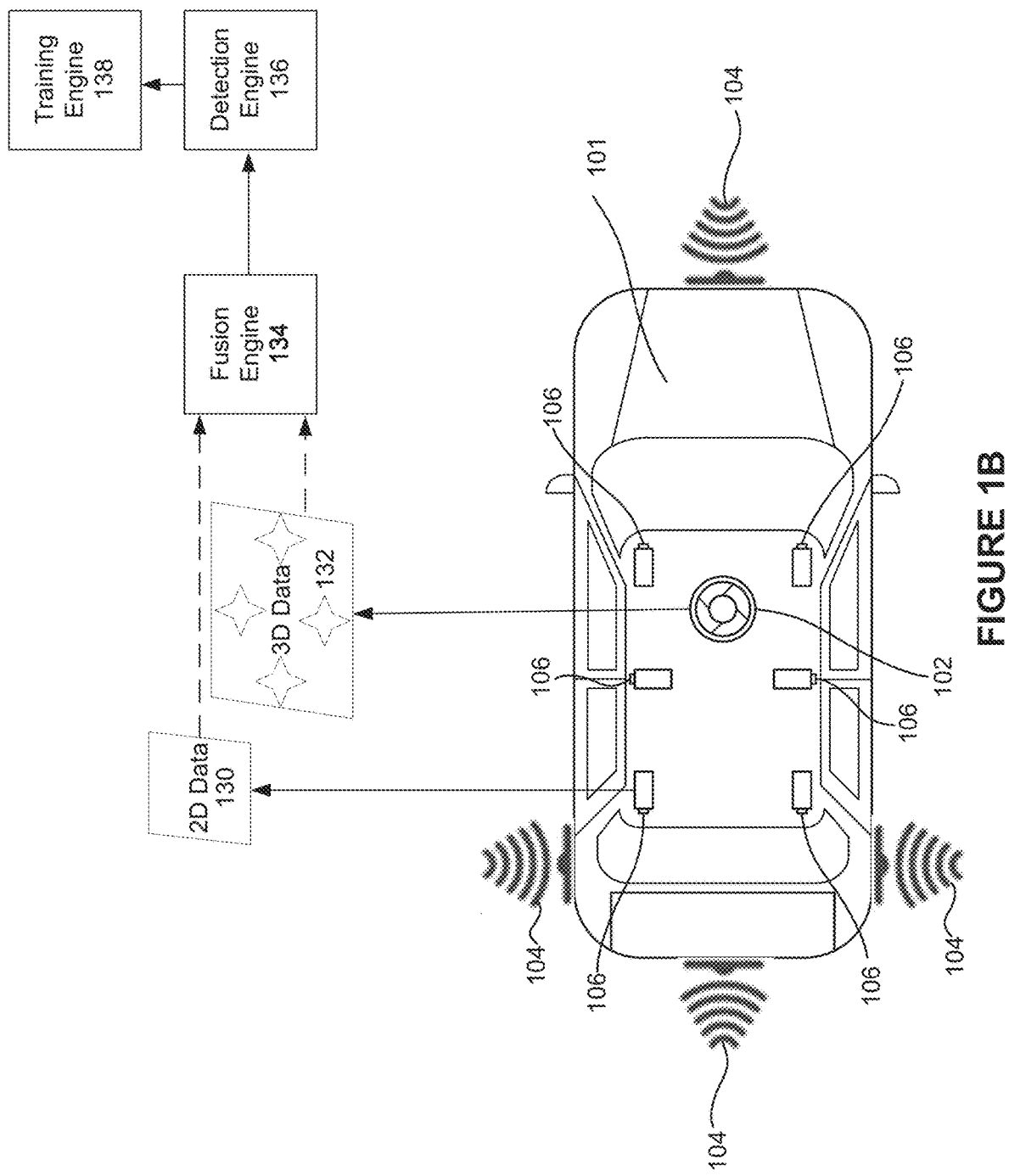
FIG. 1B illustrates a hybrid data flow and block diagram that depicts training a model to infer an intent, in accordance with an example embodiment of the present disclosure.

FIG. 1B illustrates a hybrid data flow and block diagram that depicts training a model to infer an intent, in accordance with an example embodiment. In FIG. 1B, the computing system 122 may include, at least, a fusion engine 134, a detection engine 136, and a training engine 138. In some embodiments, functions described with respect to the fusion engine 134, the detection engine 136, and the training engine 138 may be performed by a single processor or any number of processors. For example, functions described with respect to the fusion engine 134, the detection engine 136, and the training engine 138 may be may be combined or integrated into a single processor, and some or all functions performed by one or more of functions described with respect to the fusion engine 134, the detection engine 136, and the training engine 138 may be may not be spatially separated, but instead may be performed by a common processor. In FIG. 1B, the camera 104 may capture 2D data frames 130 and the Lidar 102 may capture 3D data frames 132. The 2D data frames 130 and the 3D data frames 132 may be synchronized based on relative positions and/or orientations between the camera 104 and the Lidar 102, and/or times at which the 2D data frames 130 and the 3D data frames 132 were captured. Optionally, the 2D data frames 130 and the 3D data frames 132, following synchronization, may be fused by the fusion engine 134 based on common features and/or portions of data captured in both the 2D data frames 130 and the 3D data frames 132. In some examples the common features and/or portions of data may include, one or more common regions such as common geographic coordinates, or common entities such as a situation in which both the 2D data frames 130 and the 3D data frames 132 including a view of a same vehicle or landmark. In some examples, the fusion engine 134 may fuse the 2D data frames 130 and the 3D data frames 132 using a fuzzy logic inference framework and smooth consecutive frames using a Markov random field based temporal fusion method.

Figure 2:
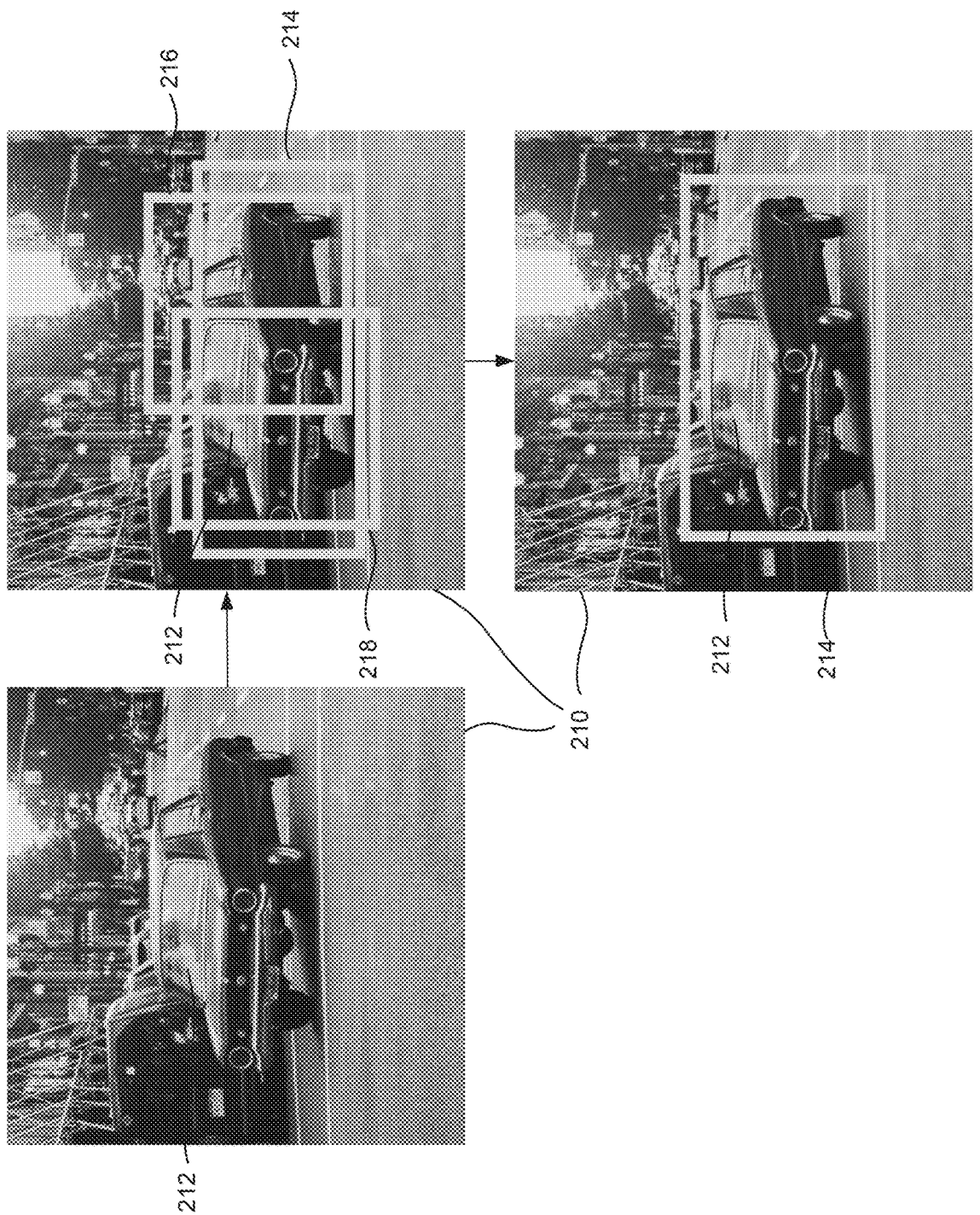
FIG. 2 illustrates an implementation of the computing system shown in accordance with FIGS. 1A-1B, to depict determining a bounding region, in accordance with an example embodiment of the present disclosure.

The detection engine 136 may detect entities within either the 2D data frames 130, 3D data frames 132, and/or the data resulting from the fusion of the 2D data frames 130 and the 3D data frames 132, by determining bounding regions such as bounding boxes that enclose the entities such as vehicles, pedestrians, and other landmarks of interest. The detection engine 136 may determine the bounding regions in each of the 2D data frames 130, the 3D data frames 132, and/or the fused 2D/3D data frames as described above, categorize or classify each of the bounding regions as, for example, a vehicle, car, bicycle, pedestrian, traffic sign, or traffic light. An example of determination of bounding regions is shown in FIG. 2. Across different frames of the 2D data frames 130, 3D data frames 132, and/or the data resulting from the fusion of the 2D data frames 130 and the 3D data frames 132, the detection engine 136 may determine that a bounding region in each of the frames encloses a same entity, such as, a same vehicle, and associate all frames that enclose the same entity. Such an association may track a movement and/or trajectory of the same entity. In some embodiments, after processing by the fusion engine 134 and/or the detection engine 136, the 2D data frames 130 and/or the 3D data frames 132, and associated metadata, may be fed into a training engine 138 train a model such as a machine learning model. In some embodiments, the training engine 138 may train the model to predict a pose of a vehicle and an on or off state of turn signals and/or brake lights. During the training, the training engine 138 may incorporate other inputs such as outputs from other models including segmentation models that perform semantic segmentation, instance segmentation, or other segmentation. The model may further be trained to leverage features from other models such as object detection models, 2D models, 2D/3D models, 3D models, and bird's eye view simulation models. The inputs incorporated into the training engine 138 may be cropped and/or resized to fit dimensions of the bounding regions of the 2D data frames 130, the 3D data frames 132, and/or the fused 2D/3D data frames. The operations associated with the training engine 138 are shown in FIGS. 3A, 3B, 4A, 4B, and 5. In some embodiments, the fusion engine 134 may fuse the 2D data frames 130 and the 3D data frames 132 at other stages, such as after the detection process or during the training process. In some embodiments, if a probability associated with a prediction does not satisfy a threshold, the model may be trained to supplement an input with data from another modality such as Lidar, if an initial data fed into the model was camera data.

FIG. 2 illustrates an implementation of the computing system 122, for example, the detection engine 136, to depict determining a bounding region in a frame 210 that includes a vehicle 212. First, multiple overlapping bounding regions 214, 216, and 218 are determined using a neural network or a you only look once (YOLO) algorithm. The overlapping bounding regions 214, 216, and/or 218 may be sorted based on their respective scores indicating a likelihood or probability that the bounding regions 214, 216, and/or 218 contain the vehicle 212. In some embodiments, only a single bounding region 214 having a highest score may be selected via Non-Maximum Suppression to remove overlapping and redundant bounding regions.

Figure 3A:
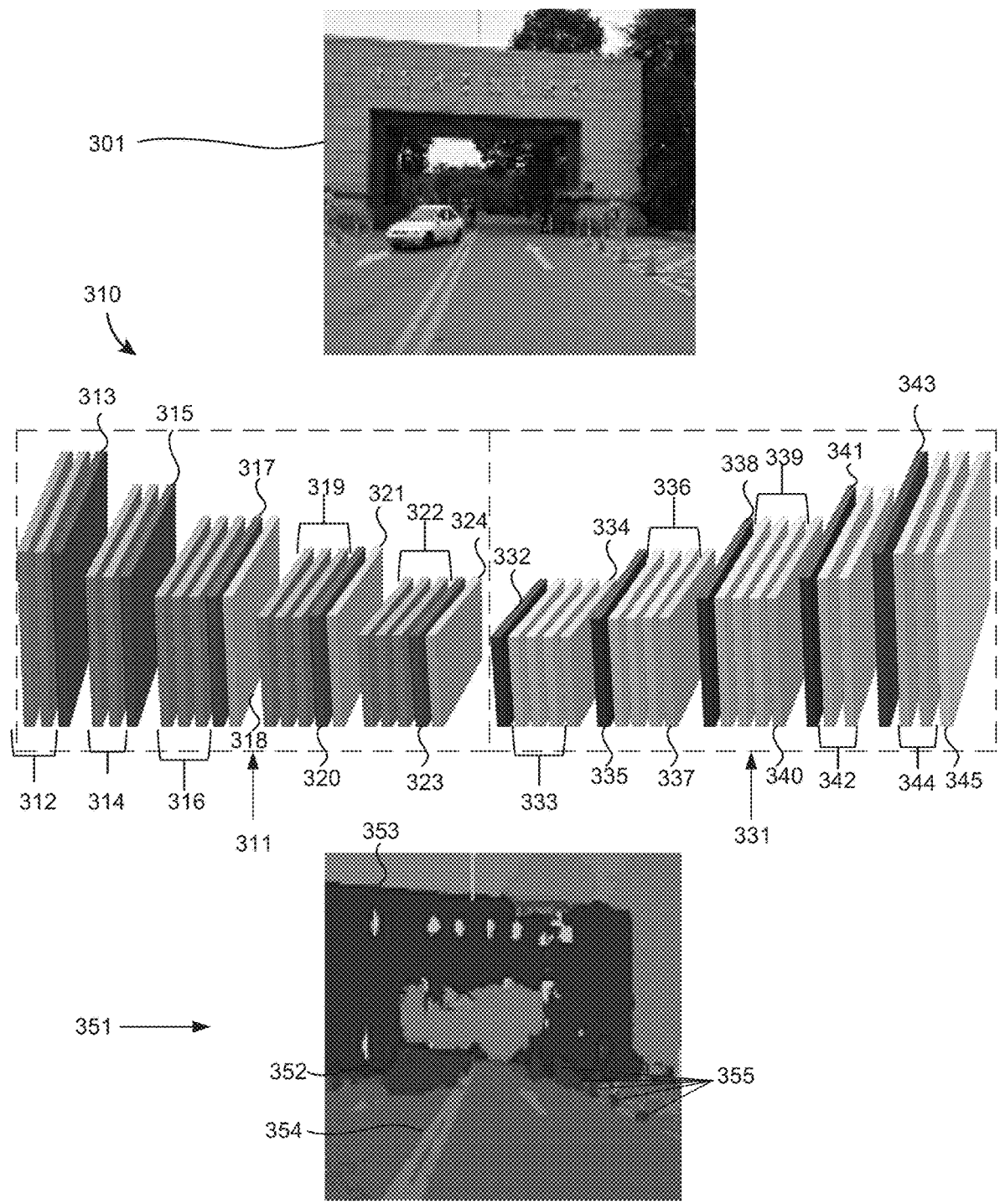
FIG. 3A illustrates an exemplary implementation of a semantic segmentation process, in accordance with an example embodiment of the present disclosure.

FIG. 3A illustrates an exemplary implementation of a semantic segmentation process that an input 301 may undergo, using a model 310. The model 310 is merely exemplary; other models may be utilized to carry out semantic segmentation. The model 310 may include a neural network model such as a convolution neural network (CNN) model that predicts a classification or category of each pixel of the image 301. The model 310 may include an encoder 311 that performs convolution and reduces a spatial dimension and a decoder 331 decoupled with the encoder and that performs deconvolution, unpooling, and upsampling to recover the details in the input 301 and the spatial dimension, to predict a classification or category of each pixel of the input 301, which may include camera and/or Lidar data. The encoder 311 may include a sequence having a convolution, Batch Normalization (BN), and Exponential Linear Unit (ELU) layer (convolution+BN+ELU layer), shown at 312, 314, 316, 319, and 322, pooling layers 313, 315, 317, 320, and 322, and dropout layers 318, 321, and 324. The convolution+BN+ELU layers 312, 314, 316, 319, and 322 may have a seven by seven kernel size. In some examples, one or more of the convolution+BN+ELU layers 312, 314, 316, 319, and 322 may include dilated or atrous convolution layers. The dilated or atrous convolution layers may be parallel and have different sampling rates and/or dilation rates. The pooling layers 313, 315, 317, 320, and 322 may have two by two pooling windows. The pooling layers 313, 315, 317, 320, and 322 may carry out max pooling. Max pooling indices may be transferred to the decoder 331 to improve resolution of the segmentation. In other embodiments, the pooling layers 313, 315, 317, 320, and 322 may carry out average pooling or stochastic pooling.

The decoder 331 may carry out a non-linear upsampling to construct complete features maps from sparse max-pooling indices obtained from the pooling layers in the encoder. The decoder 331 may output classification or category probabilities of each pixel of the image 301. The decoder 331 may include upsampling layers 332, 335, 338, 341 and 343, deconvolution, Batch Normalization (BN), and Exponential Linear Unit (ELU) layers (deconvolution+BN+ELU layers) 333, 336, 339, 342, and 344, dropout layers 334, 337, and 340, and a softmax layer 345. The softmax layer 345 may apply a softmax function to classify each pixel and obtain probabilities that a pixel belongs to a particular classification or category. The input 301 may then be passed to a classification-specific segmentation map having background and foreground channels to obtain an output 391. Different classifications or categories of entities may be distinguished in the output 391, such as, a vehicle 392, a building structure 393, a lane marking 394, and traffic cones 395. The output 391 may further be processed based on pixel intensities, under a principle that similar intensity pixels tend to be labeled as a same classification or category. In some embodiments, the output 391 may further be processed by conditional random fields (CRF). An output from a model such as that shown in FIG. 3A may be fed into another model that infers intent, such as that shown in FIG. 5.

Figure 3B:
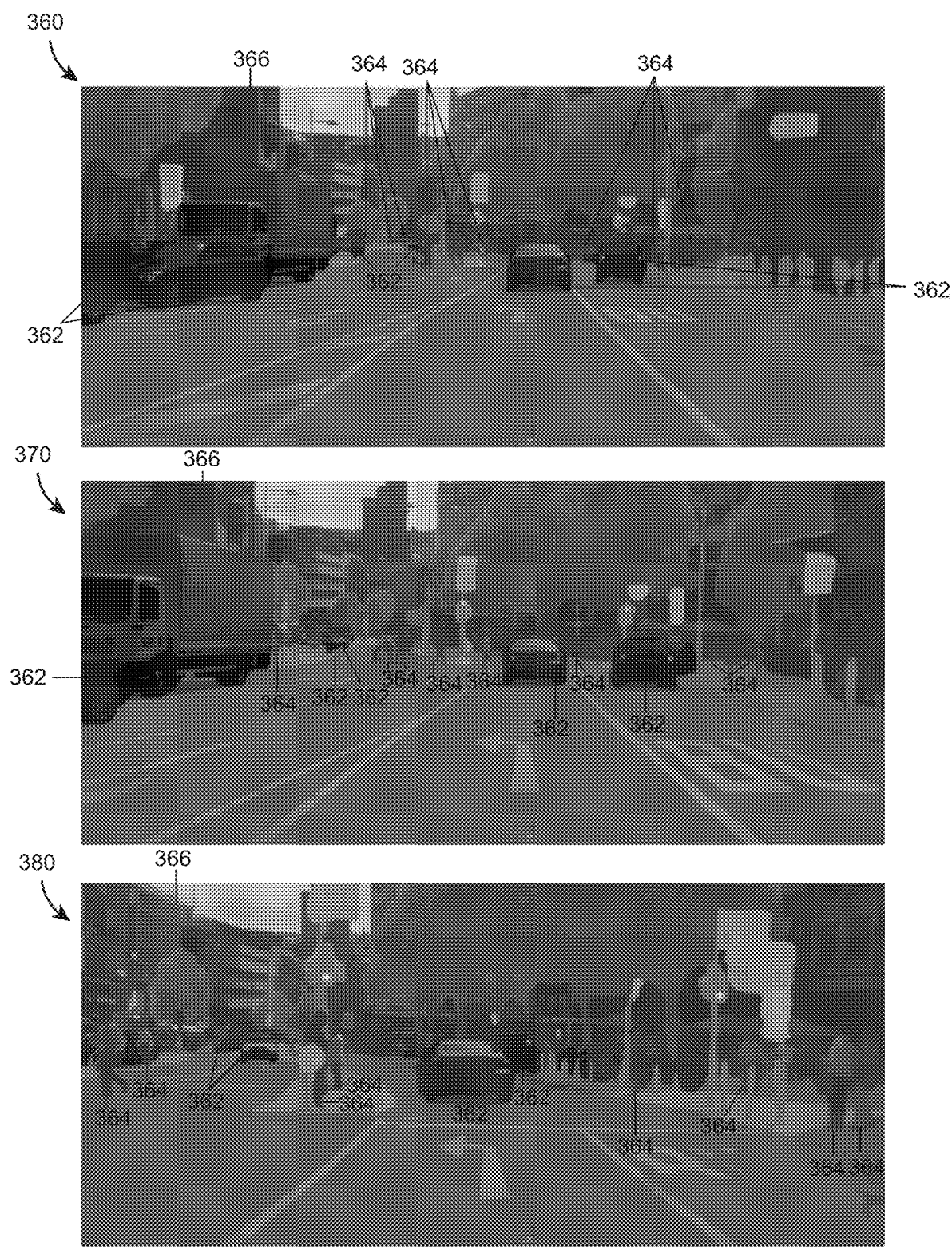
FIG. 3B illustrates an implementation of semantic segmentation over different frames, in accordance with an example embodiment of the present disclosure.

FIG. 3B illustrates an implementation of semantic segmentation over different frames 360, 370, and 380. In the different frames 360, 370, and 380, entities of different classifications or categories are distinguished. The entities include cars 362, pedestrians 364, and building structures 366.

Figure 4A:
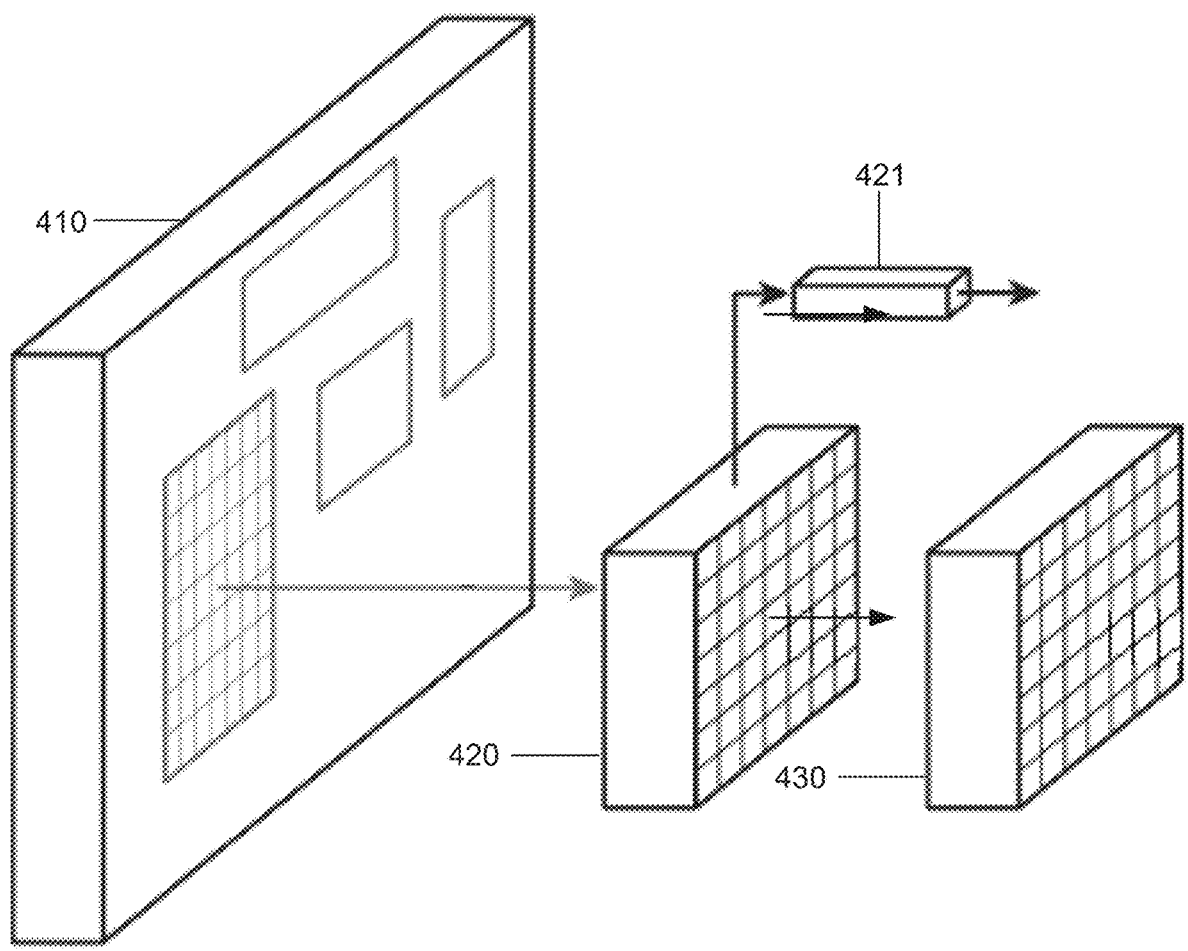
FIG. 4A illustrates an exemplary setup used to perform instance segmentation, in accordance with an example embodiment of the present disclosure.

FIG. 4A illustrates an exemplary setup used to perform instance segmentation. In FIG. 4A, a neural network 410 may extract feature maps from input images and propose regions of interest (ROIs) in which objects are likely to exist. The neural network 410 may include a region proposal network (RPN). The neural network 410 may preserve spatial locations between the ROIs and the extracted features of a feature map. The neural network 410 may avoid quantization of boundaries of ROIs. The features from the ROIs may be transformed into fixed size feature vectors. A network 420 may predict a segmentation mask 421 on each ROI, in a pixel-to-pixel manner, in parallel with a network 430 that performs classification and bounding box regression. A binary mask may be predicted for all classifications independently. In some examples, the network 420 may be a fully convolutional network (FCN) while the network 430 may be a CNN. In such a setup, mask prediction and classification prediction may be decoupled. The setup shown in FIG. 4A is merely exemplary; other models may be used to perform instance segmentation. An output from a model such as that shown in FIG. 4A may be fed into another model that infers intent, such as that shown in FIG. 5.

By identifying different instances of a same category or classification of entity, predictions of one entity may be compared and/or corroborated with observations of other entities. For example, if a model predicts or infers that a particular vehicle has a turn light in an on state, the model may further perform a sanity check by determining whether pixels in corresponding regions of turn lights in other vehicles also have a similar illumination pattern, which may indicate that the turn light is not actually in an on state and that the perceived or apparent illumination may be caused by external sources such as environmental conditions. Comparing and/or corroborating observations of other vehicles may further help the model elucidate current contextual conditions and environmental effects and adjust or calibrate its predictions or inferences based on the current contextual conditions and environmental effects. Additionally, by clearly delineating separate instances of a same category or classification such as a vehicle, the model may further predict or infer which particular instances and/or region of pixels require tracking over time, and/or a degree of tracking required for particular instances and/or regions of pixels.

Figure 4B:
FIGS. 4B-4C illustrate exemplary implementations of instance segmentation, in accordance with an example embodiment of the present disclosure.

FIG. 4B illustrates an implementation of instance segmentation being carried out on an image 440. Following instance segmentation, persons 441 and 442, a bicycle 443, and vehicles 444 and 445 may be identified. Thus, not only are classifications or categories determined, but different instances of a common classification are also identified. In particular, persons 441 and 442 are determined to be different persons and vehicles 444 and 445 are determined to be different vehicles.

Figure 4C:
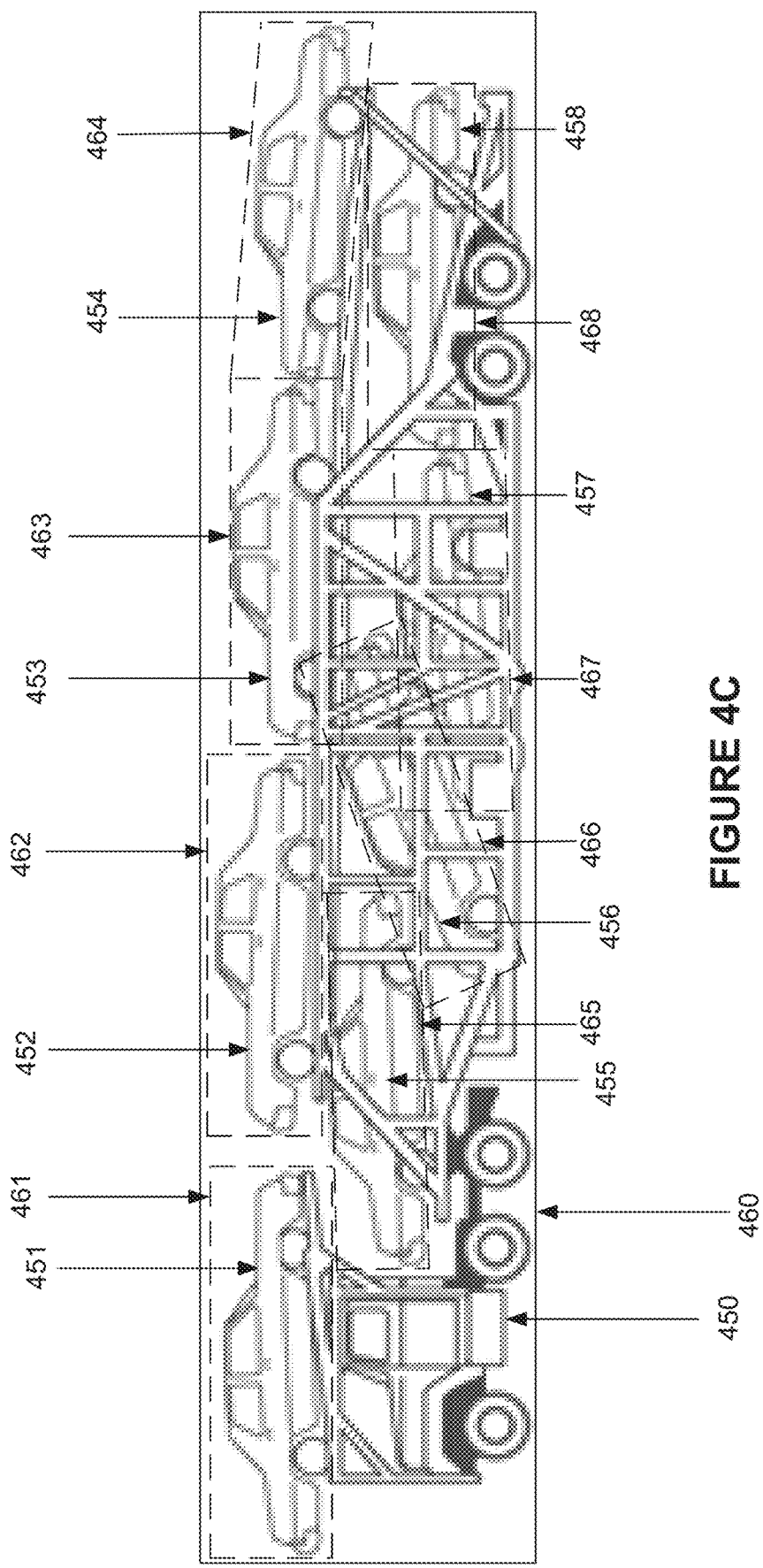

FIG. 4C illustrates an exemplary implementation of instance segmentation being carried out. FIG. 4C shows a truck that tows other vehicles. In some embodiments, a bounding box or ROI 460 may be identified to correspond to and/or enclose an entity 450. In some embodiments, bounding boxes or ROIs 461, 462, 463, 464, 465, 466, 467, and 468 may be identified to correspond to and/or enclose the vehicles 451, 452, 453, 454, 455, 456, 457, and 458, respectively. Therefore, even though the bounding boxes or ROIs 461, 462, 463, 464, 465, 466, 467, and 468 may be overlapping with the bounding box or ROI 460, this instance segmentation procedure infers that the bounding boxes or ROIs 461, 462, 463, 464, 465, 466, 467, and 468 enclose different entities than the bounding box or ROI 460. Because the vehicles 451 to 458 are all attached to and move in a manner dependent on and in conjunction with the entity 450, pixels corresponding to the bounding boxes or ROIs 461, 462, 463, 464, 465, 466, 467, and 468 may be identified as not requiring separate tracking.

Figure 5:
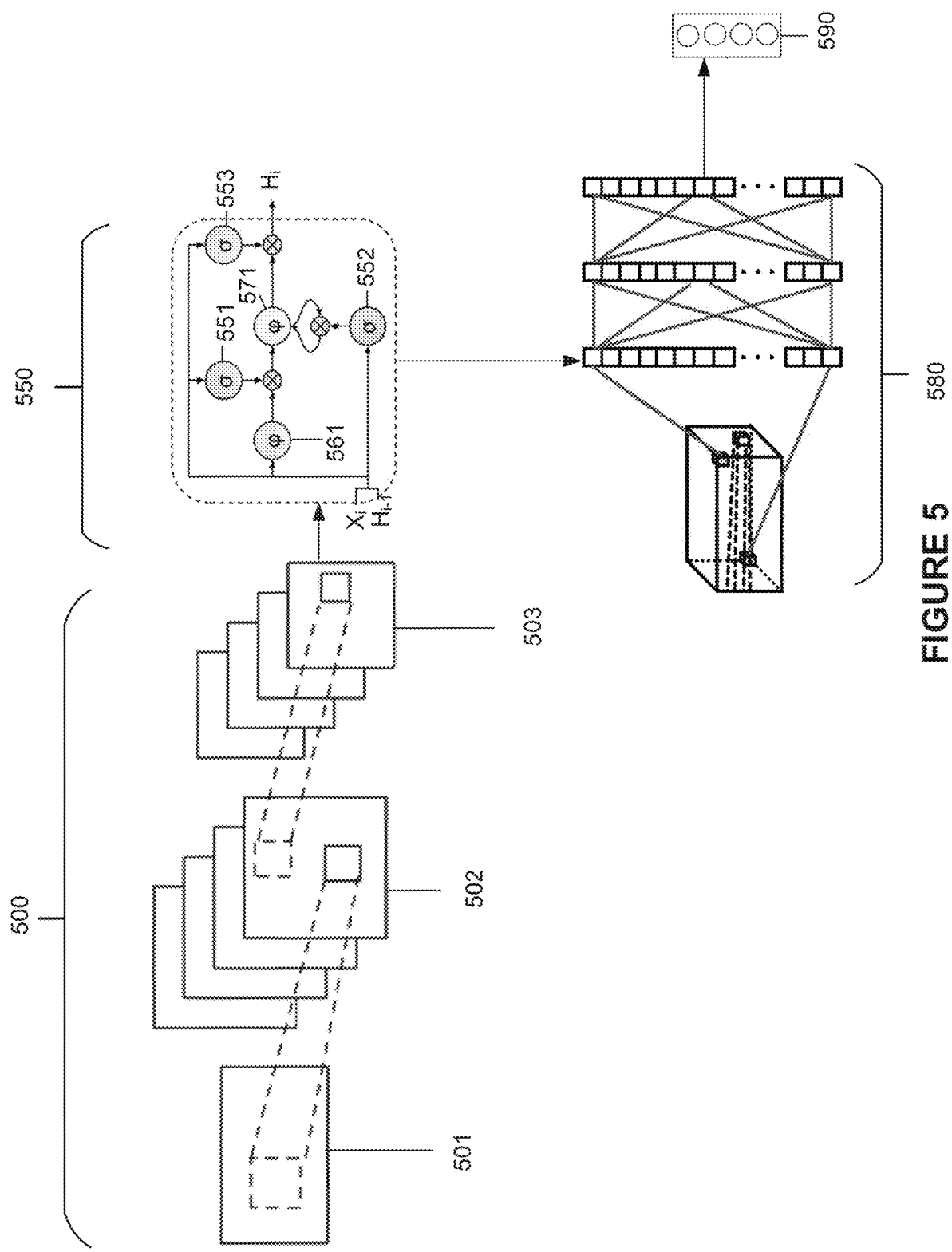
FIG. 5 illustrates an implementation of a model that may be trained to infer an intent of an entity within one or more bounding regions, in accordance with an example embodiment of the present disclosure.

FIG. 5 illustrates an implementation of a model that may be trained to infer an intent of an entity within one or more bounding regions of 2D data frames (e.g., 130), 3D data frames (e.g., 132), and/or the fused 2D/3D data frames as described in FIG. 1B. A first portion 500 of the model may include a CNN. The CNN may incorporate, into an input layer 501, that may include bounding regions of the 2D data frames, the 3D data frames, and/or the fused 2D/3D data frames. In some examples, the input may be a 224 by 224 RGB image. The CNN may further incorporate outputs from other models including segmentation models that perform semantic segmentation as described in FIGS. 3A and 3B, models that perform instance segmentation as described in FIGS. 4A, 4B, and 4C, or other segmentation models. The CNN may further be trained to leverage or incorporate features other models such as object detection models, 2D models, 2D/3D models, 3D models, and bird's eye view simulation models. The input may be passed into one or more first convolution layers 502 supplemented with Rectified Linear Unit (ReLU) layers (convolution+ReLU layers), and pooling layers 503. The convolution+ReLU layers 502 may include filters used with a three by three kernel sized receptive field. In some embodiments, the first and second convolution+ReLU layers 502 may include additional one by one convolution filters. In some embodiments, a stride with which convolution is performed may be one pixel and a padding may be one pixel. In some examples, some of the convolution+ReLU layers 502 may be arranged alternatively with the pooling layers 503 and/or at least one of the convolution+ReLU layers 502 may not be followed by pooling layers 503. In some embodiments, the pooling layers 503 may perform max pooling. The pooling layers 503 may further include a kernel, padding, and be moved in strides. In some embodiments, the pooling layers 503 may perform a max pooling operation over a two by two pixel window with stride two. In other embodiments, the pooling layers 503 may perform average pooling or stochastic pooling.

The model may also include a LSTM model 550 in order to make predictions on inferences based on temporal sequences of the 2D, 3D, and/or 2D/3D data frames. The LSTM model 550 may learn to store or ignore certain information from the inputs obtained from the CNN model 500. In some embodiments, each extracted feature from the CNN model 500 may be fed into the LSTM model 550. The LSTM model 550 may include an input gate 551, a forget gate 552, an output gate 553, and optionally, an input modulation gate 561. σ represents a sigmoid gate activation function, φ represents a tan h input/output activation function, and x is a multiplication operator. A cell 571 may have a memory state that is updated in every step with information from the input gate 551 and the input modulation gate 561, and the forget gate 552. $H_i$ is the new state as extracted through the output gate 553 from the cell 571. $H_{i-1}$ represents a most recent previous hidden state and $X_i$ represents a current observation. The combined CNN and LSTM model may be particularly tailored in this situation which involves both spatial and temporal sequences.

An output from the LSTM model 550 may be flattened, for example into a single column vector, and fed into one or more fully connected (FC) layers 580, and a softmax layer 590. In some examples, the FC layers 580 may include two FC layers of 4096 channels each. The FC layers 580 may apply weights to predict classifications or categories of the entities. The softmax layer 590 may output probability values between zero and one for each classification or category. In some examples, the softmax layer 590 may include 1000 channels and/or a number of channels equal to a number of classifications or categories.

In some embodiments, another model other than a CNN-LSTM model may be trained to infer an intent of an entity. Such models may include a Hidden Markov Model (HMM), radial basis function (RBF) network, a recurrent neural network (RNN), or a deep neural network (DNN). During training of a model, for example, the CNN-LSTM model as shown in FIG. 5, or another model, a loss may be determined based on a classification loss, a bounding box loss, and/or a mask prediction loss. In some embodiments, the classification loss may indicates how close classification or category predictions are to a true class. In some embodiments, a bounding box loss may indicates how effective the model is at localization. In some embodiments, a mask prediction loss may be determined by taking a binary cross-entropy between the predicted mask, such as a mask as described with respect to FIG. 4A, and the ground truth and takes into account incorrect pixel-level binary classifications. In some embodiments, the loss may be determined by taking a sum of the classification loss, the bounding box loss, and/or the mask prediction loss.

Figure 6:
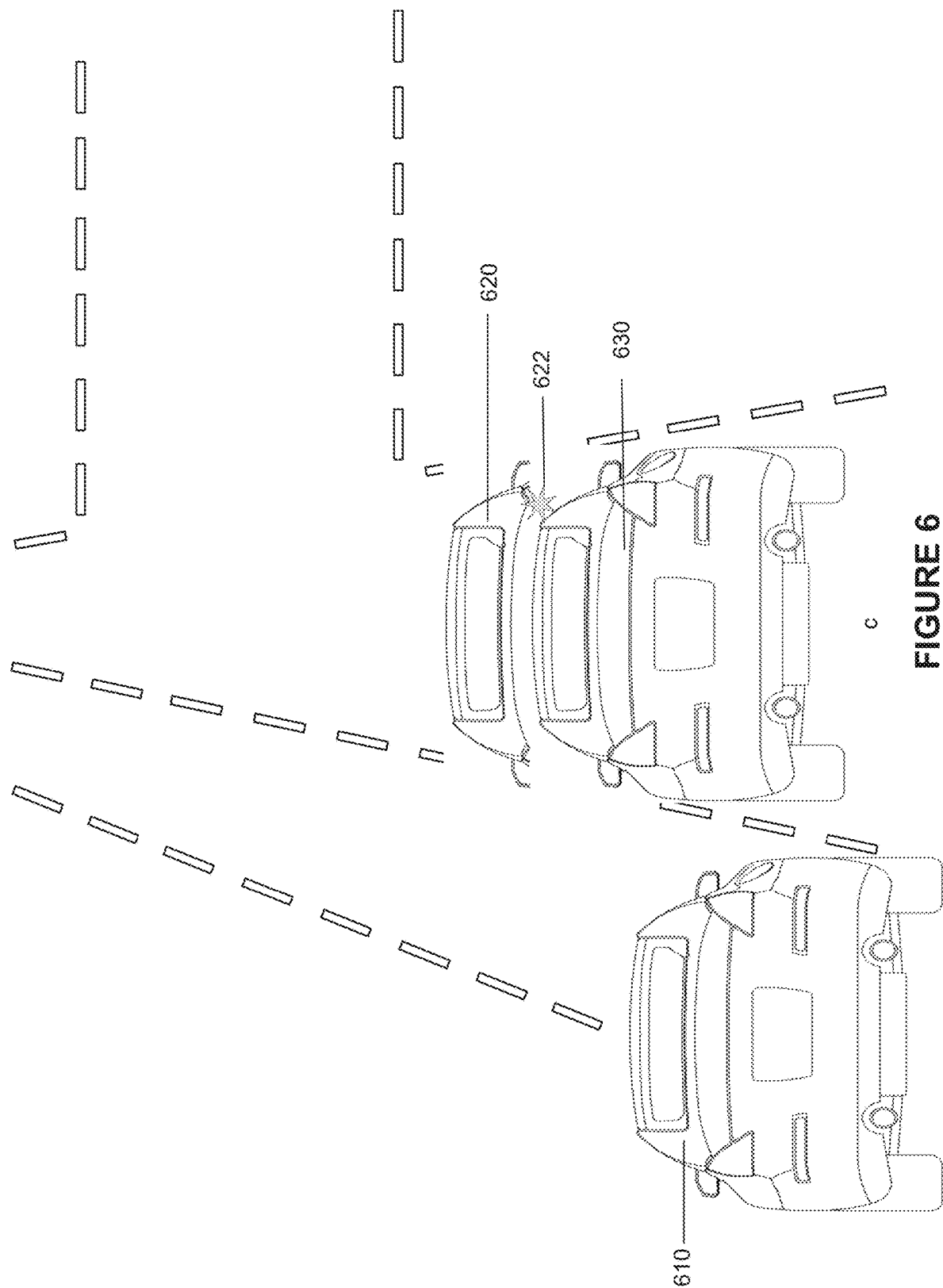

FIGS. 6-10, 11A-11B, and 12-13 illustrate exemplary training scenarios of training a model, such as the model described in the previous figures including FIG. 5, to infer intents of vehicles. In FIG. 6, a vehicle 610, which may be implemented as the vehicle 101 in FIG. 1A, may infer an intent of a vehicle 620 that may be at least partially obscured by a vehicle 630. The vehicle 630 may be travelling within a given distance of the vehicle 620. The vehicle 610 may detect a turn signal light 622 which may appear to be in an on state. The turn signal light 622 is shown as a right turn signal light for exemplary purposes only. In other embodiments, the turn signal light 622 may be a left turn signal light. The vehicle 610 may verify or predict whether the turn signal light 622 is actually in an on state rather than actually being off, by leveraging one or more feature based models and/or segmentation models. The one or more feature based models may predict how a turn signal light may appear, in both an on and an off state, under a similar situation as the vehicle 620 under an effect of shadows and/or other light from another nearby vehicle such as the vehicle 630 within the given distance or a given range of distances and a particular orientation or range of orientations, and/or when a driving vehicle such as the vehicle 610 is within a particular distance or range of distances. The prediction may further be based on previous examples or scenarios in similar environmental, such as lighting, conditions, and/or weather conditions. For example, the previous examples or scenarios may be restricted to conditions that are within a certain range of illuminance compared to a current illuminance in an environment of the vehicle 610. The one or more segmentation models may be used to predict whether the apparent illumination of the turn signal light 622 belongs to the vehicle 620, or whether it is from an external light or shadow, for example, from the vehicle 630. In other embodiments, the vehicle 610 may alternatively verify or predict that the turn signal light 622 appearing to be in an off state is indeed off. Although a turn signal light is described with respect to FIG. 6, the vehicle 610 may also infer or predict an on or off state of a brake light on the vehicle 620 in a similar or same manner. In other embodiments, the vehicle 610 may also be trained to distinguish between an on state of a brake light and an on state of a turn signal light.

Figure 7:
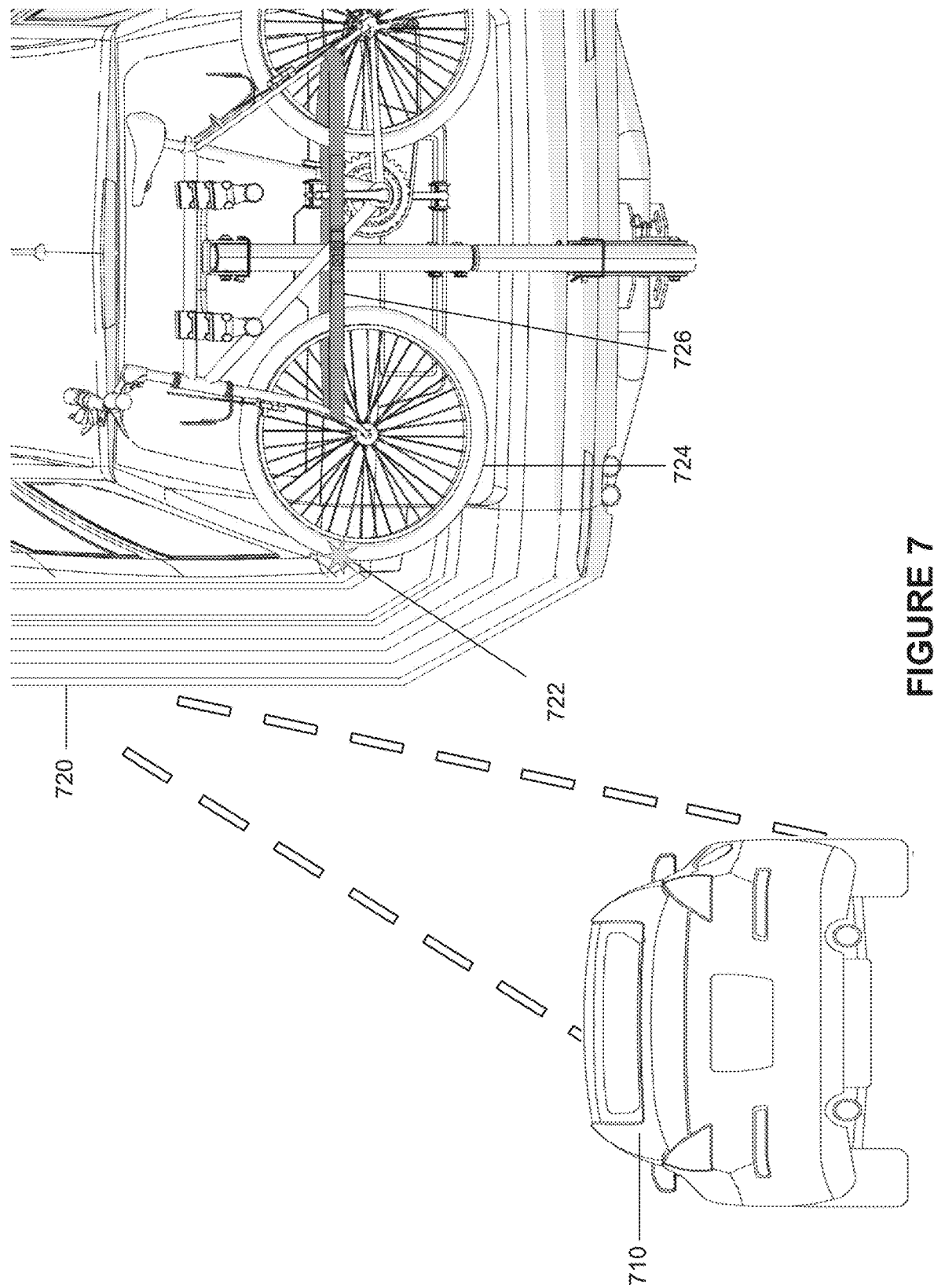

In FIG. 7, a vehicle 710, which may be implemented as the vehicle 101 in FIG. 1A, may infer an intent of a vehicle 720 that has a bicycle 724 mounted on a bicycle rack 726. The vehicle 710 may detect a turn signal light 722 on a left turn signal light which may appear to be in an on state. The turn signal light 722 is shown on the left turn signal light for exemplary purposes only. In other embodiments, the turn signal light 722 may be a right turn signal light. The vehicle 710 may verify or predict whether the turn signal light 722 is actually in an on state rather than actually being off, by leveraging one or more feature based models and/or segmentation models. The one or more feature based models may predict how a turn signal light, in both on and off states, may appear if a bicycle and/or bicycle rack are mounted on a back of a vehicle. The prediction may be based on a viewing distance or range of distances from the vehicle, as the turn signal light may appear different if it is farther away compared to closer. The prediction may further be based on previous examples or scenarios in similar environmental, such as lighting, conditions, and/or weather conditions. For example, the previous examples or scenarios may be restricted to conditions that are within a certain range of illuminance compared to a current illuminance in an environment of the vehicle 710. The one or more segmentation models may be used to predict whether the apparent illumination of the turn signal light 722 belongs to the vehicle 720, or whether it is from an external light or shadow, for example, resulting from the bicycle 724 and/or the bicycle rack 726. Additionally, the one or more segmentation models may detect that the bicycle 724 and the bicycle rack 726 do not belong to any portion of any turn signal lights of the vehicle 720. The training process may reduce or eliminate a possibility that the vehicle 710 mistakenly detects the bicycle 724 and/or the bicycle rack 726 as a turn signal light, and accounts for an effect of the bicycle 724 and/or the bicycle rack 726 on how the turn signal lights may appear. In some embodiments, the vehicle 710 may alternatively verify or predict that the turn signal light 722 appearing to be in an off state is indeed off. Although a turn signal light is described with respect to FIG. 7, the vehicle 710 may also infer or predict an on or off state of a brake light on the vehicle 720 in a similar or same manner. In other embodiments, the vehicle 710 may also be trained to distinguish between an on state of a brake light and an on state of a turn signal light.

Figure 8:
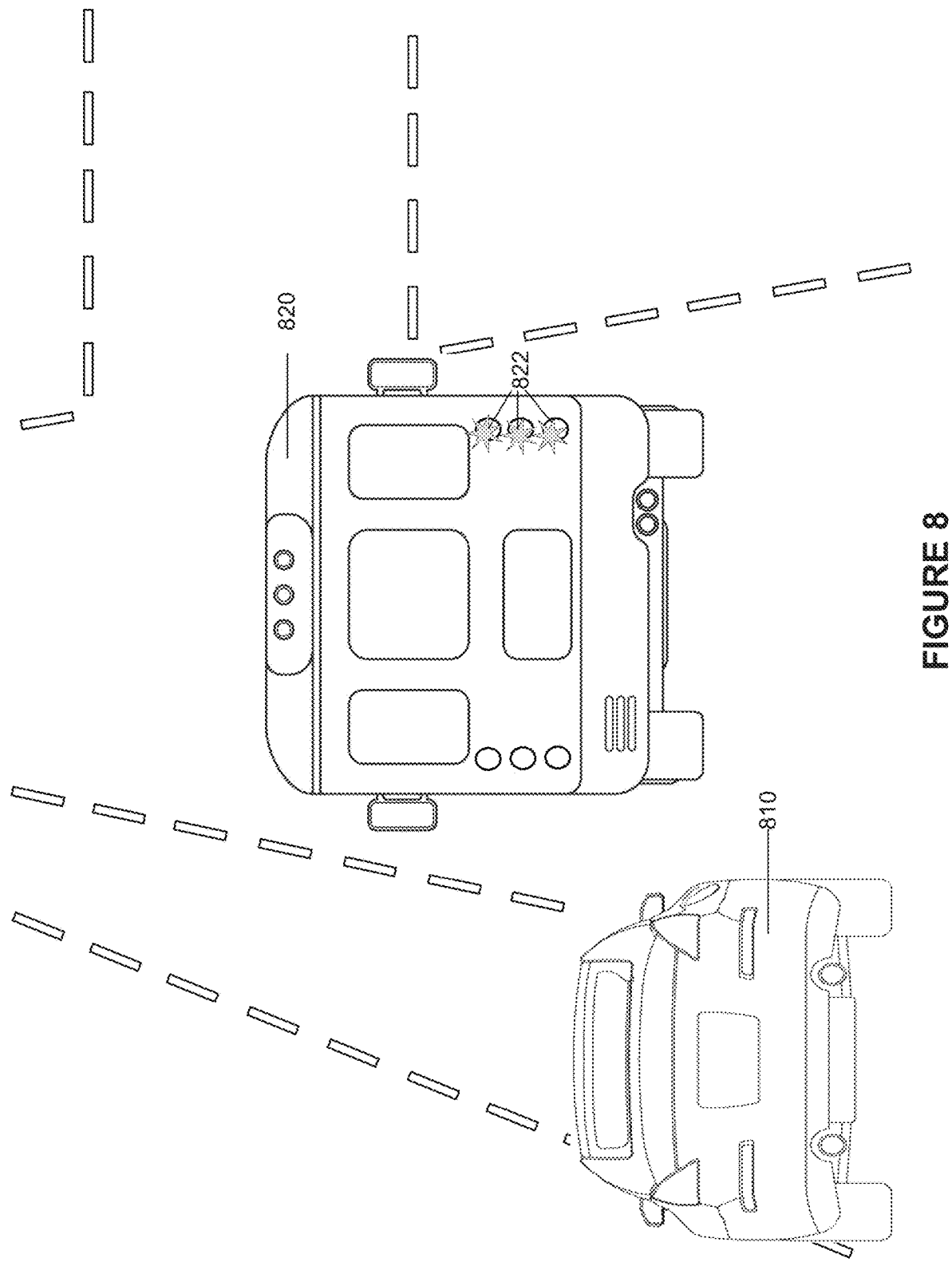

In FIG. 8, a vehicle 810, which may be implemented as the vehicle 101 in FIG. 1A, may infer an intent of a vehicle 820 such as an ice cream truck that has an unconventional shape and layout of turn signal lights 822 and brake lights. The vehicle 810 may be trained to properly detect an actual location of the turn signal lights 822 and that the turn signal lights 822 are actually on. The turn signal lights 822 are shown as right turn signal lights for exemplary purposes only. In other embodiments, the turn signal lights 822 may be left turn signal lights. The vehicle 810 may verify or predict that the turn signal lights 822 are actually in an on state by leveraging one or more feature based models and/or segmentation models. The one or more feature based models may predict how a turn signal light in an on state and an off state may appear in unconventionally shaped vehicles. The prediction of whether the turn signal lights 822 are actually on may be based on a viewing distance from the vehicle, as the turn signal lights may appear different if they is farther away compared to closer. The prediction may further be based on previous examples or scenarios in similar environmental, such as lighting, conditions, and/or weather conditions. For example, the previous examples or scenarios may be restricted to conditions that are within a certain range of illuminance compared to a current illuminance in an environment of the vehicle 810. The one or more segmentation models may be used to predict and/or verify that the turn signal lights 822 are actually classified or categorized as turn signals and further predict and/or verify that the turn signal lights 822 belong to the vehicle 820. The training process may reduce or eliminate a possibility that the vehicle 810 mistakenly overlooks the turn signal lights 822. In some embodiments, the vehicle 810 may alternatively verify that turn signal lights appearing to be in an off state are indeed off. Although a turn signal light is described with respect to FIG. 8, the vehicle 810 may also infer or predict an on or off state of a brake light on the vehicle 820 in a similar or same manner. In other embodiments, the vehicle 810 may also be trained to distinguish between an on state of a brake light and an on state of a turn signal light.

Figure 9:
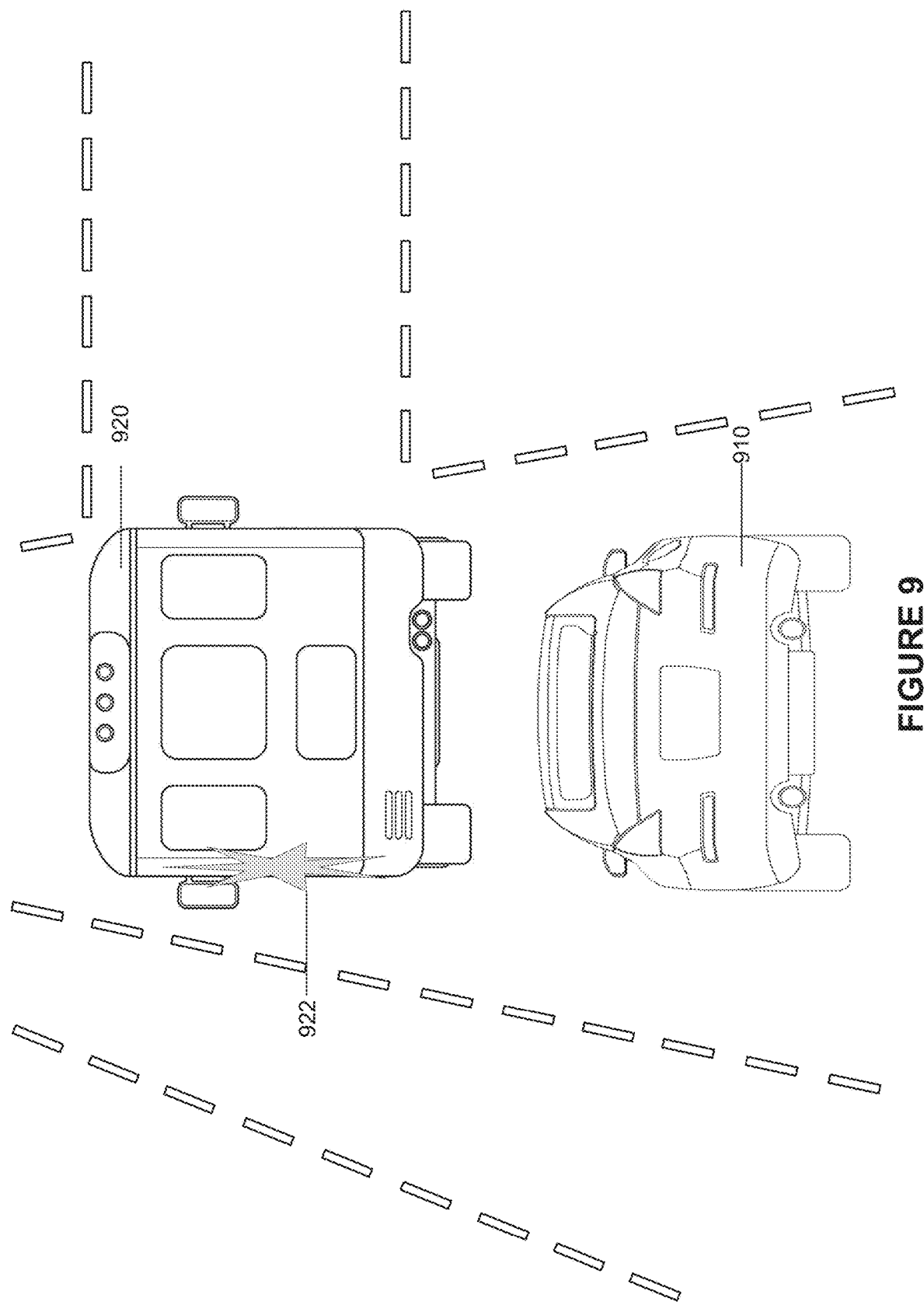

In FIG. 9, a vehicle 910, which may be implemented as the vehicle 101 in FIG. 1A, may infer an intent of a vehicle 920 that has an unconventional shape of turn signal lights 922 and brake lights. The vehicle 910 may be trained to properly detect an actual location of the turn signal lights 922, recognizing that the turn signal lights 922 may be in a form of a long column, and that the turn signal lights 922 are actually on. The vehicle 910 may be implemented in a same or similar manner compared to the vehicle 810.

Figure 10:
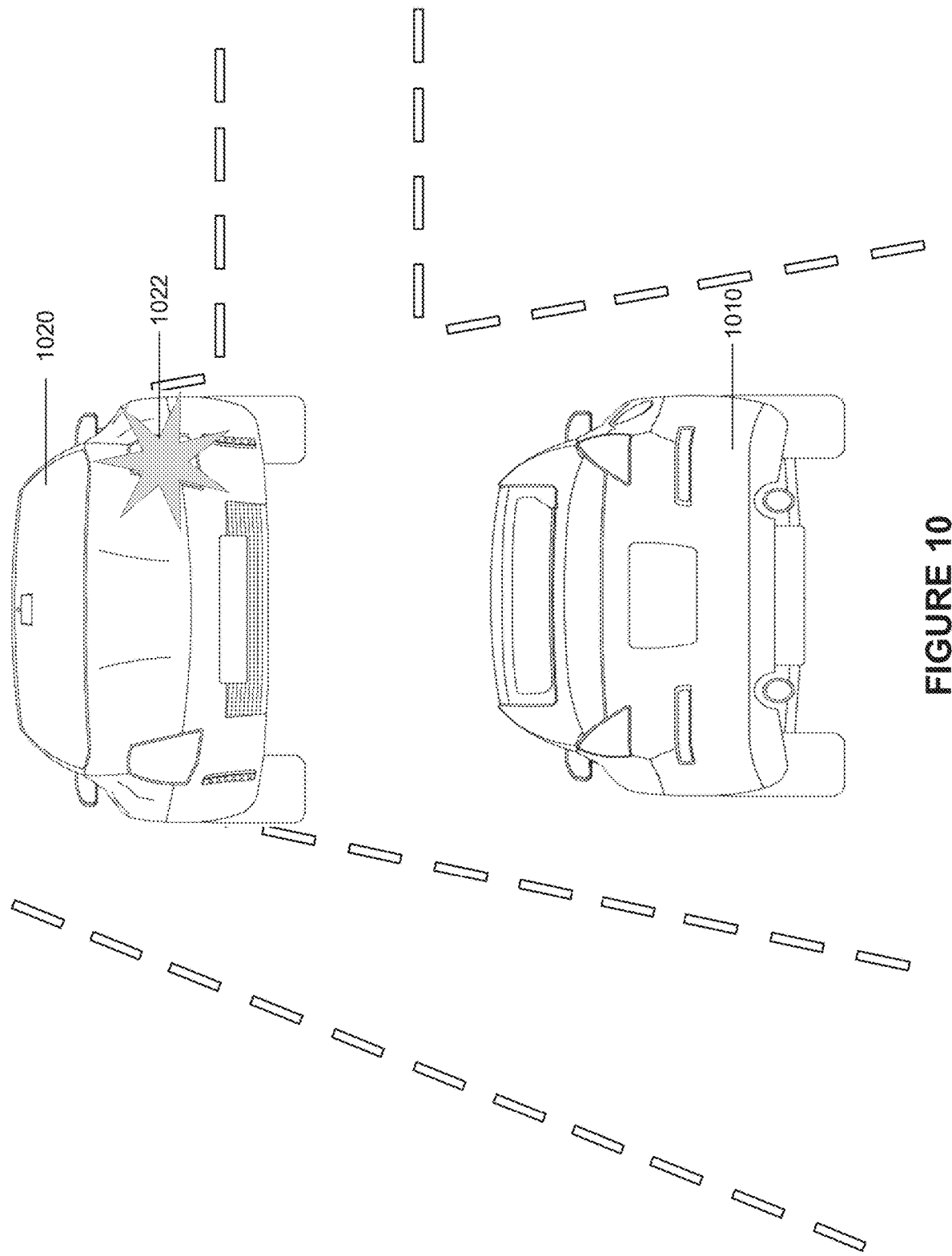

In FIG. 10, a vehicle 1010, which may be implemented as the vehicle 101 in FIG. 1A, may infer a pose and an intent of a vehicle 1020 that is driving in a wrong direction. The vehicle 1010 may be trained to properly detect that the vehicle 1020 is driving towards the vehicle 1010, despite the vehicle 1020 being on a same lane, so that the vehicle 1010 correctly identifies that the turn signal light 1022 as a left turn signal light rather than a right turn signal light. The vehicle 1010 may verify or predict a pose of the vehicle 1030 by leveraging one or more feature based models and/or segmentation models. The one or more feature based models may predict whether a vehicle is rear-facing or front-facing. In some examples, the prediction may be based on an existence or lack of a center high mount stop lamp, also known as a center brake lamp, eye-level brake lamp, or safety brake lamp. If a vehicle is rear-facing, its center high mount stop lamp may be visible, but if a vehicle is front-facing, no center high mount stop lamp is visible. In some examples, the prediction may additionally be based on other features of a rear of a vehicle, such as a location of a license plate, an existence of mufflers, and/or a curvature of a vehicle contour. The training process may reduce or eliminate a possibility that the vehicle 1010 may automatically determine that the vehicle 1020 is rear-facing just because the vehicle 1020 is driving on a same lane as the vehicle 1010.

Figure 11A:
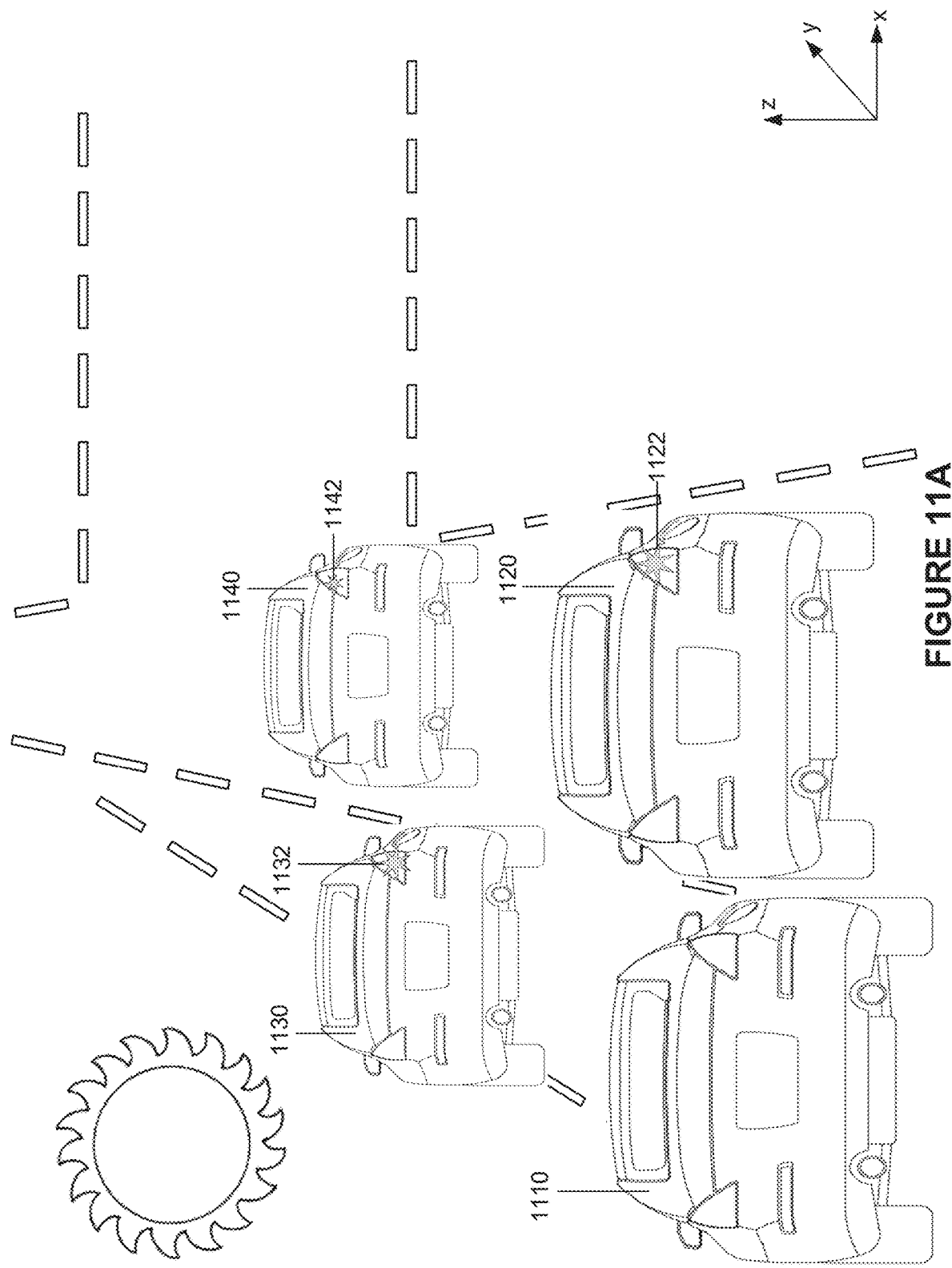

In FIG. 11A, a vehicle 1110, which may be implemented as the vehicle 101 in FIG. 1A, may infer an intent of a vehicle 1120 in a sunny or otherwise bright environment. The vehicle 1110 may be travelling within a given distance of the vehicle 1120. The vehicle 1110 may detect a turn signal light 1122 of the vehicle 1120 which may appear to be in an on state. The turn signal light 1122 is shown as a right turn signal light for exemplary purposes only. In other embodiments, the turn signal light 1122 may be a left turn signal light. The vehicle 1110 may verify or predict whether the turn signal light 1122 is actually in an on state rather than actually being off, by leveraging one or more feature based models and/or segmentation models. The one or more feature based models may predict how a turn signal light in an on and off state may appear under bright lighting conditions and when the vehicle 1120 is within a given viewing distance or a given range of distances and a particular orientation or range of orientations from another vehicle such as the vehicle 1110. The prediction may further be based on previous examples or scenarios in similar lighting conditions. For example, the previous examples or scenarios may be restricted to conditions that are within a certain range of illuminance compared to a current illuminance in an environment of the vehicle 1110. Additionally, one or more feature based models may be used by the vehicle 1110 to incorporate other contextual information from surroundings, such as how pixels at locations corresponding to or in a vicinity of turn signal lights 1132 and/or 1142 from respective vehicles 1130 and/or 1140 are displayed. For example, the vehicle 1110 may conduct a comparison to determine that an amount of illuminance of the turn signal light 1122 may not be greater than an amount of illuminance of the turn signal lights 1132 and/or 1142, which increases the likelihood that the turn signal light 1122 is actually off and that the illuminance is attributed to bright lighting conditions. However, if the amount of illuminance of the turn signal light 1122 is greater than an amount of illuminance of the turn signal lights 1132 and/or 1142, by at least a threshold amount, the likelihood that the turn signal light 1122 is actually on is increased. The one or more segmentation models may be used to predict whether the apparent illumination of the turn signal light 1122 belongs to the vehicle 1120, or whether the apparent illumination is from external light. Additionally, instance segmentation may be used to distinguish vehicles 1120, 1130, and 1140 as separate entities, and turn signal lights 1122, 1132, and 1142 as separate entities. In other embodiments, the vehicle 1110 may alternatively verify or predict that the turn signal light 1122 appearing to be in an off state is indeed off. Although a turn signal light is described with respect to FIG. 11A, the vehicle 1110 may also infer or predict an on or off state of a brake light on the vehicle 1120 in a similar or same manner. In other embodiments, the vehicle 1110 may also be trained to distinguish between an on state of a brake light and an on state of a turn signal light.

Figure 11B:
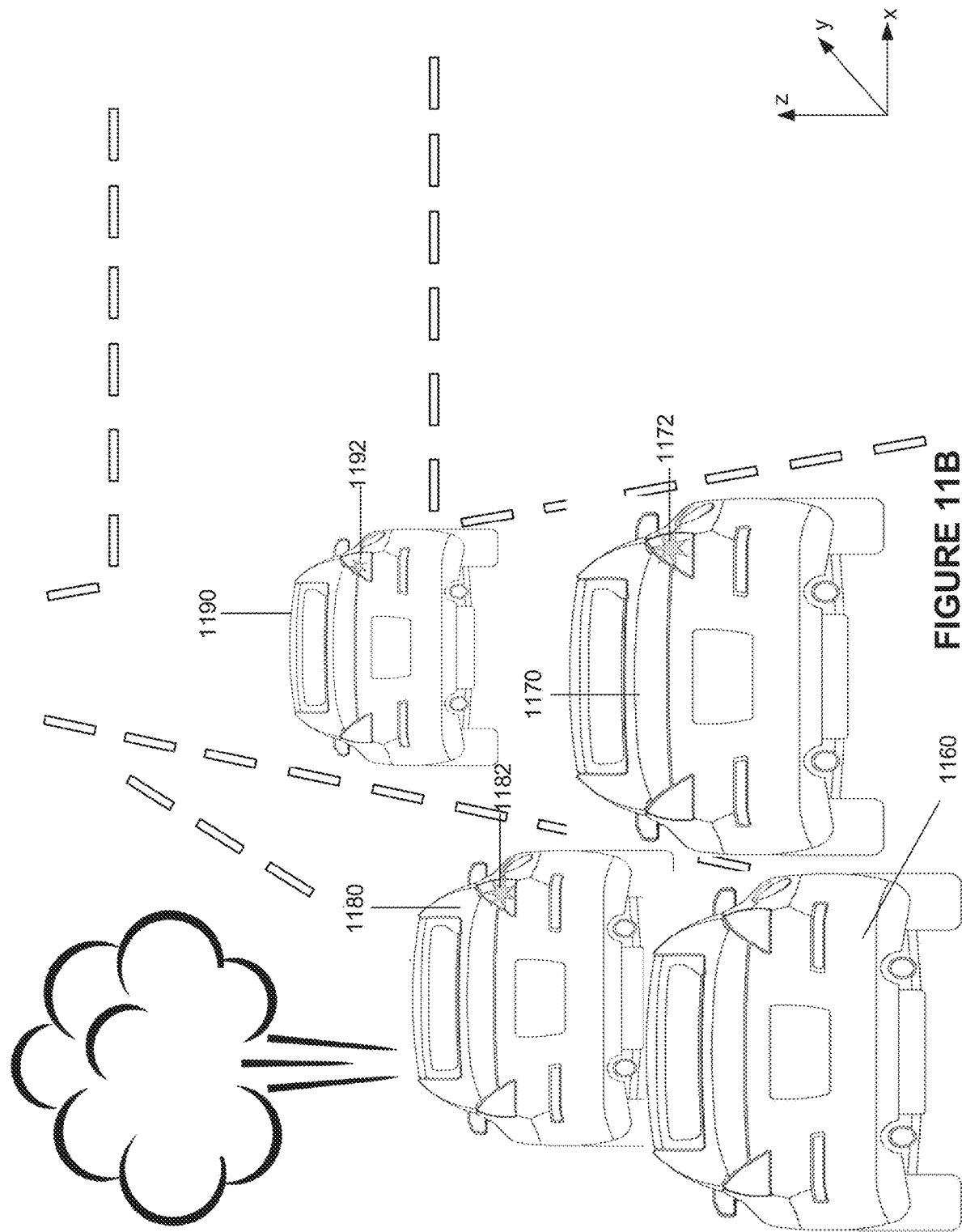

In FIG. 11B, a vehicle 1160, which may be implemented as the vehicle 101 in FIG. 1A, may infer an intent of a vehicle 1170 in a dusty, hazy, or otherwise obstructed view environment. The vehicle 1160 may be travelling within a given distance of the vehicle 1170. The vehicle 1160 may detect a turn signal light 1172 of the vehicle 1170 which may appear to be in an off state. The turn signal light 1172 is shown as a right turn signal light for exemplary purposes only. In other embodiments, the turn signal light 1172 may be a left turn signal light. The vehicle 1160 may verify or predict whether the turn signal light 1172 is actually in an off state rather than actually being on, by leveraging one or more feature based models and/or segmentation models. The one or more feature based models may predict how a turn signal light in an on and off state may appear under obstructed lighting conditions and when the vehicle 1170 is within a given viewing distance or a given range of distances and a particular orientation or range of orientations from another vehicle such as the vehicle 1160. The prediction may further be based on previous examples or scenarios in similar environmental and/or lighting conditions. For example, the previous examples or scenarios may be restricted to conditions that are within a certain range of visibility compared to a current visibility in an environment of the vehicle 1160. Additionally, one or more feature based models may be used by the vehicle 1160 to incorporate other contextual information from surroundings, such as how pixels at locations corresponding to or in a vicinity of turn signal lights 1182 and/or 1192 from respective vehicles 1180 and/or 1190 are displayed. For example, the vehicle 1160 may conduct a comparison to determine that an amount of illuminance of the turn signal light 1172 may not be greater than an amount of illuminance of the turn signal lights 1182 and/or 1192, which increases the likelihood that the turn signal light 1172 is actually off. However, if the amount of illuminance of the turn signal light 1172 is greater than an amount of illuminance of the turn signal lights 1182 and/or 1192, by at least a threshold amount, the likelihood that the turn signal light 1172 is actually on is increased. In some examples, the turn signal light 1172 may appear to be in an off state, but may have a higher amount of illuminance compared to the turn signal lights 1182 and/or 1192, which increases the likelihood that the turn signal light 1172 is actually on. The one or more segmentation models may be used to predict whether any apparent illumination of the turn signal light 1172 belongs to the vehicle 1170, or whether the apparent illumination is from an external source. Additionally, instance segmentation may be used to distinguish vehicles 1170, 1180, and 1190 as separate entities, and turn signal lights 1172, 1182, and 1192 as separate entities. Although a turn signal light is described with respect to FIG. 11B, the vehicle 1160 may also infer or predict an on or off state of a brake light on the vehicle 1170 in a similar or same manner. In other embodiments, the vehicle 1160 may also be trained to distinguish between an on state of a brake light and an on state of a turn signal light.

In FIG. 12, a vehicle 1210, which may be implemented as the vehicle 101 in FIG. 1A, may infer an intent of a vehicle 1210 during a nighttime environment. The vehicle 1210 may be travelling within a given distance of the vehicle 1220. The vehicle 1210 may detect a turn signal light 1222 of the vehicle 1220 which may appear to be in an off state. The turn signal light 1222 is shown as a right turn signal light for exemplary purposes only. In other embodiments, the turn signal light 1222 may be a left turn signal light. The vehicle 1210 may verify or predict whether the turn signal light 1222 is actually in an off state rather than actually being on, by leveraging one or more feature based models and/or segmentation models. The one or more feature based models may predict how a turn signal light in an on and off state may appear under nighttime lighting conditions and when the vehicle 1220 is within a given viewing distance or a given range of distances and a particular orientation or range of orientations from another vehicle such as the vehicle 1210. The prediction may further be based on previous examples or scenarios in similar nighttime conditions. For example, the previous examples or scenarios may be restricted to conditions that are within a certain range of visibility or lighting compared to a current visibility or lighting in an environment of the vehicle 1210. Additionally, one or more feature based models may be used by the vehicle 1210 to incorporate other contextual information from surroundings, such as how pixels at locations corresponding to or in a vicinity of turn signal lights 1232 and/or 1242 from respective vehicles 1230 and/or 1240 are displayed. For example, the vehicle 1210 may conduct a comparison to determine that an amount of illuminance of the turn signal light 1222 may not be greater than an amount of illuminance of the turn signal lights 1232 and/or 1242, which increases the likelihood that the turn signal light 1222 is actually off. However, if the amount of illuminance of the turn signal light 1222 is greater than an amount of illuminance of the turn signal lights 1232 and/or 1242, by at least a threshold amount, the likelihood that the turn signal light 1222 is actually on is increased. In some examples, the turn signal light 1222 may appear to be in an off state, but may have a higher amount of illuminance compared to the turn signal lights 1232 and/or 1242, which increases the likelihood that the turn signal light 1222 is actually on. The one or more segmentation models may be used to predict whether any apparent illumination of the turn signal light 1222 belongs to the vehicle 1220, or whether the apparent illumination is from an external source. Additionally, instance segmentation may be used to distinguish vehicles 1220, 1230, and 1240 as separate entities, and turn signal lights 1222, 1232, and 1242 as separate entities. Although a turn signal light is described with respect to FIG. 12, the vehicle 1210 may also infer or predict an on or off state of a brake light on the vehicle 1220 in a similar or same manner. In other embodiments, the vehicle 1210 may also be trained to distinguish between an on state of a brake light and an on state of a turn signal light.

Figure 13:
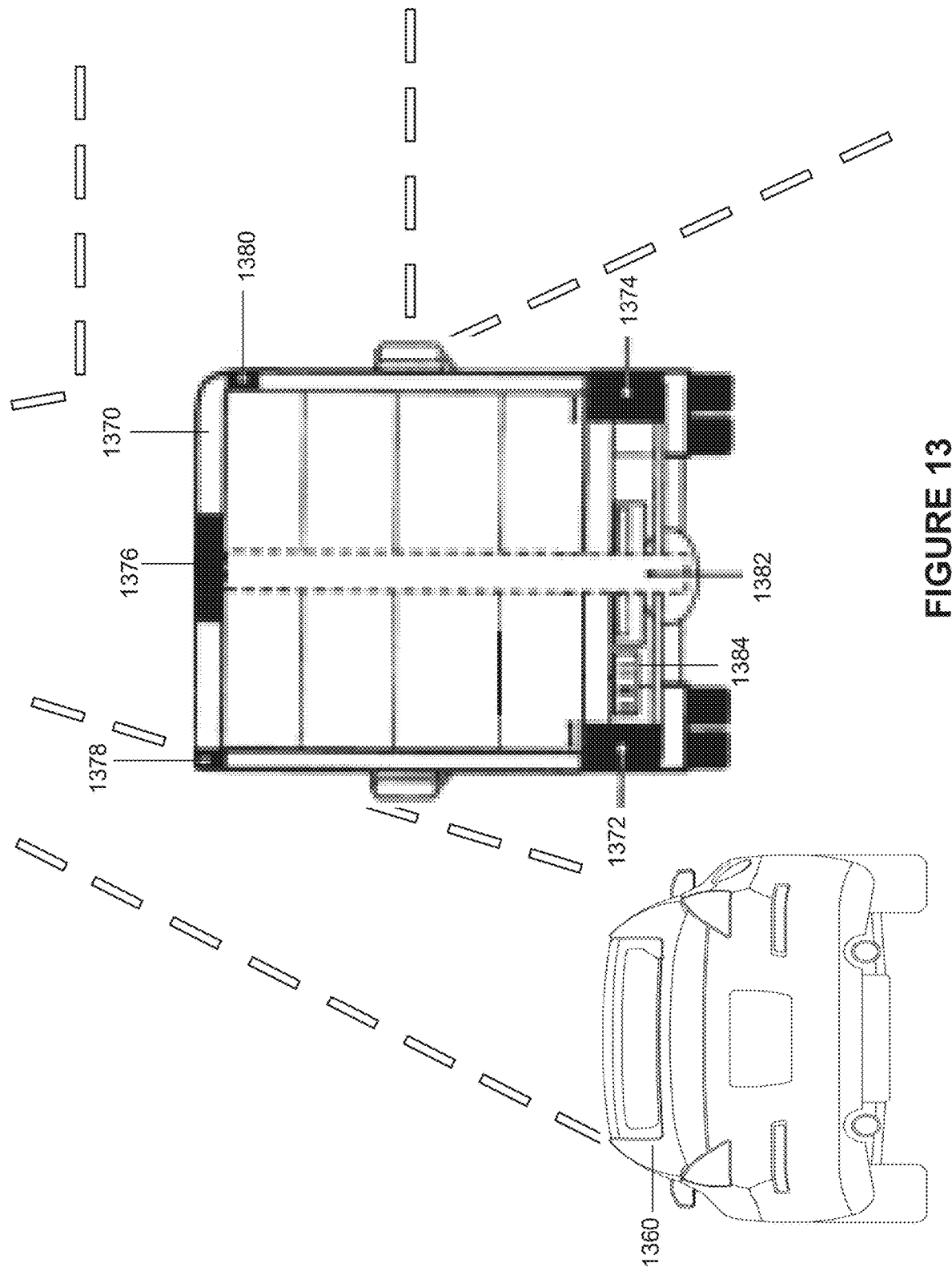

In FIG. 13, a vehicle 1360, which may be implemented as the vehicle 101 in FIG. 1A, may infer an intent of a vehicle 1370 such as a truck or trailer that has an unconventional shape and layout of turn signal lights 1372, 1374, and 1376 and brake lights. The vehicle 1370 may be trained to properly detect an actual location of the turn signal lights 1372, 1374, and 1376 and whether and which of the turn signal lights 1372, 1374, and 1376 are actually on. The vehicle 1370 may be trained to recognize that rear clearance lamps 1378 and 1380, backup lamp 1382, and license plate lamp 1384 do not fall under a category or classification of turn signal lights, for example, by leveraging one or more feature based models and/or segmentation models. The one or more feature based models may predict how a turn signal light in an on state and an off state may appear in different types of trucks or trailers having unconventional shapes. The prediction of whether any of the turn signal lights 1372, 1374, and 1376 are actually on may be based on a viewing distance from the vehicle, as the turn signal lights may appear different if they is farther away compared to closer. The prediction may further be based on previous examples or scenarios in similar environmental, such as lighting, conditions, and/or weather conditions. For example, the previous examples or scenarios may be restricted to conditions that are within a certain range of illuminance compared to a current illuminance in an environment of the vehicle 1360. The one or more segmentation models may be used to predict and/or verify that the turn signal lights 1372, 1374, and 1376 are actually classified or categorized as turn signals and further predict and/or verify that the turn signal lights 1372, 1374, and 1376 belong to the vehicle 1370. In other embodiments, the vehicle 1360 may also be trained to distinguish between an on state of a brake light and an on state of at least one of the turn signal lights 1372, 1374, and 1376.

Figure 14:
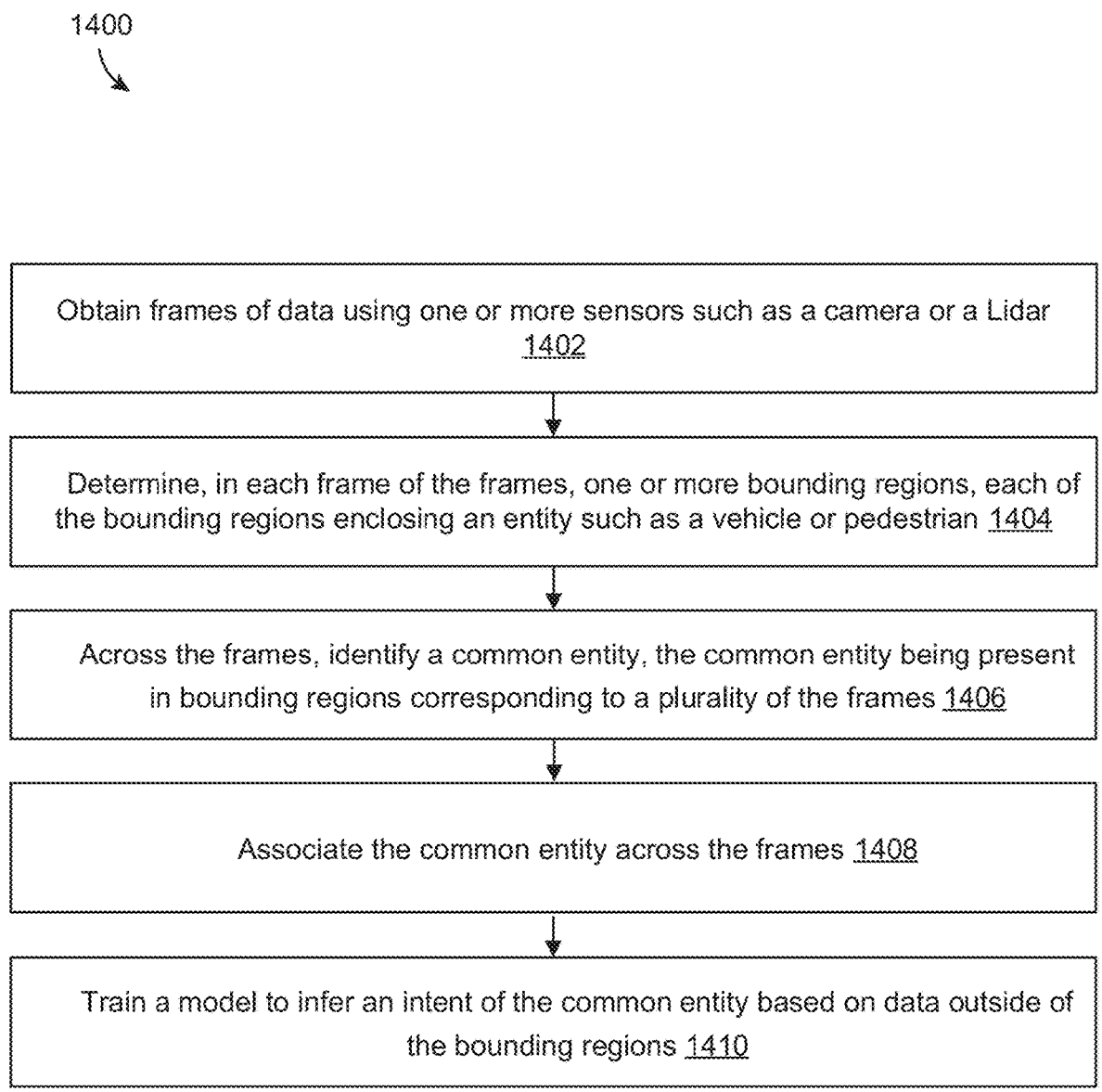
FIG. 14 illustrates a flowchart of a training method, in accordance with an example embodiment of the present disclosure.

FIG. 14 illustrates a flowchart of a training method, according to an example embodiment of the present disclosure. In this and other flowcharts, the flowchart 1400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other figures may also be applicable to FIG. 14.

In step 1402, one or more sensors such as a camera or a Lidar may obtain frames of data. In step 1404, one or more processors may determine, in each frame of the frames of data, one or more bounding regions. Each of the bounding regions may enclose an entity such as a vehicle or a pedestrian. In step 1406, one or more processors may identify a common entity that is present in bounding regions associated with a plurality of the frames. In step 1408, one or more processors may associate the common entity across the frames, for example, to track a movement of the common entity across the frames temporally and spatially. In step 1410, one or more processors may train a model such as a machine learning model to infer an intent of the common entity based on data outside of the bounding regions.

Figure 15:
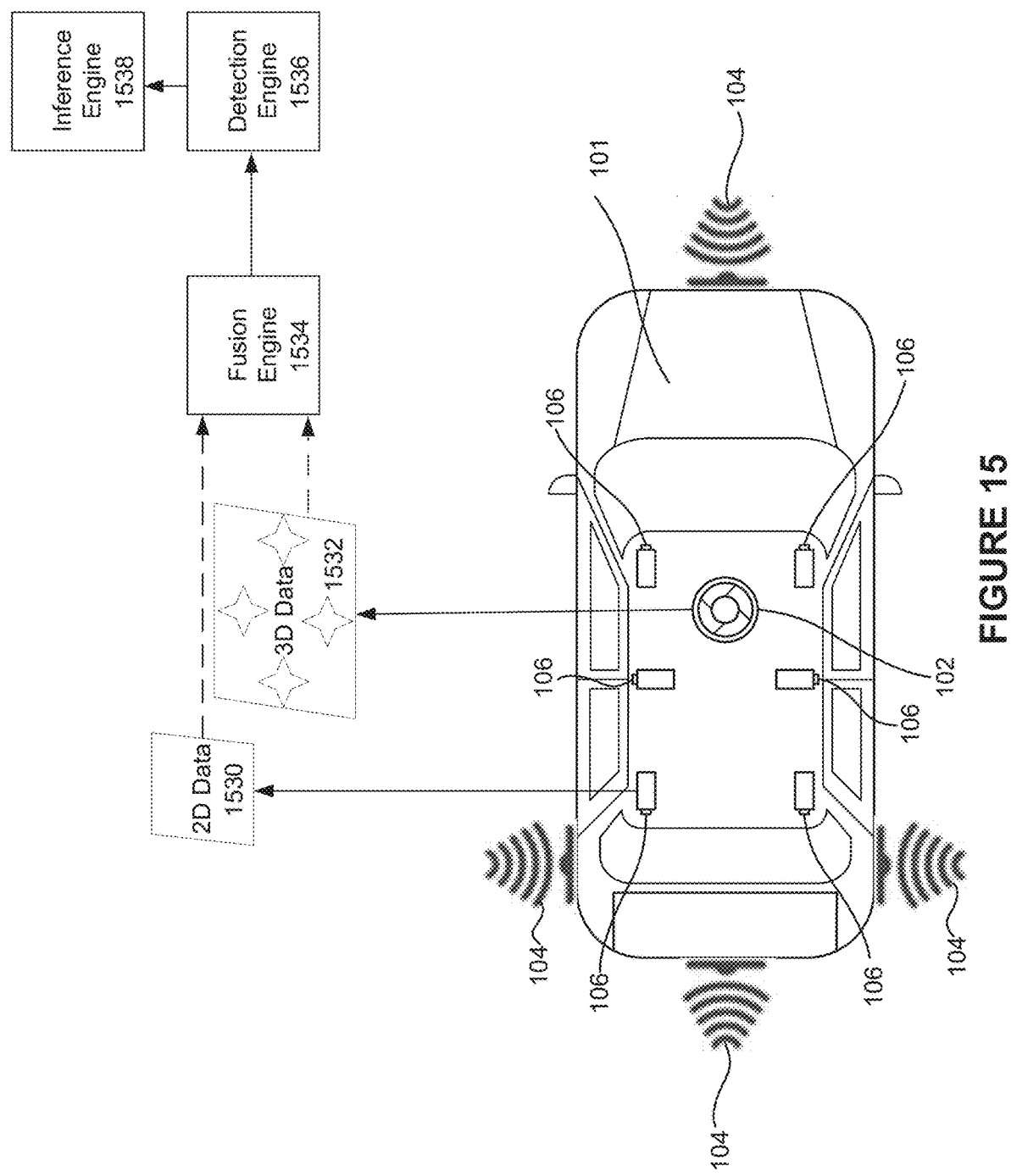
FIG. 15 illustrates a hybrid data flow and block diagram illustrating using a machine learning model to infer or predict an intent, in accordance with an example embodiment

FIG. 15 illustrates a hybrid data flow and block diagram illustrating using a machine learning model to infer or predict an intent, in accordance with an example embodiment. In FIG. 15, the camera 104 may capture 2D data frames 1530 and the Lidar 102 may capture 3D data frames 1532. The 2D data frames 1530 and the 3D data frames 1532 may be implemented as the 2D data frames 130 and the 3D data frames 132 in FIG. 1B. In FIG. 15, a fusion engine 1534 may be implemented as the fusion engine 134, and a detection engine 1536 may be implemented as the detection engine 136 of FIG. 1B. Instead of a training engine as shown in FIG. 1B, in FIG. 15, an inference engine 1538 infers or predicts an intent of an entity such as a vehicle, using a trained machine learning model such as that shown in FIG. 5.

FIG. 16 illustrates a flowchart of a prediction or inference method, according to an example embodiment of the present disclosure. The description from other figures may also be applicable to FIG. 16. In step 1602, one or more sensors such as a camera or a Lidar may obtain frames of data. In step 1604, one or more processors may determine, in each frame of the frames of data, one or more bounding regions. Each of the bounding regions may enclose an entity such as a vehicle or a pedestrian. In step 1606, one or more processors may identify a common entity that is present in bounding regions associated with a plurality of the frames. In step 1608, one or more processors may associate the common entity across the frames, for example, to track a movement of the common entity across the frames temporally and spatially. In step 1610, one or more processors may infer or predict an intent of the common entity based on data outside of the bounding regions, using a trained machine learning model, such as the model described with respect to the previous figures including FIG. 5. The obtained inference or prediction may be used as an input to control braking, steering, and/or throttle components to effectuate a throttle response, a braking action, and/or a steering action during navigation.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 17:
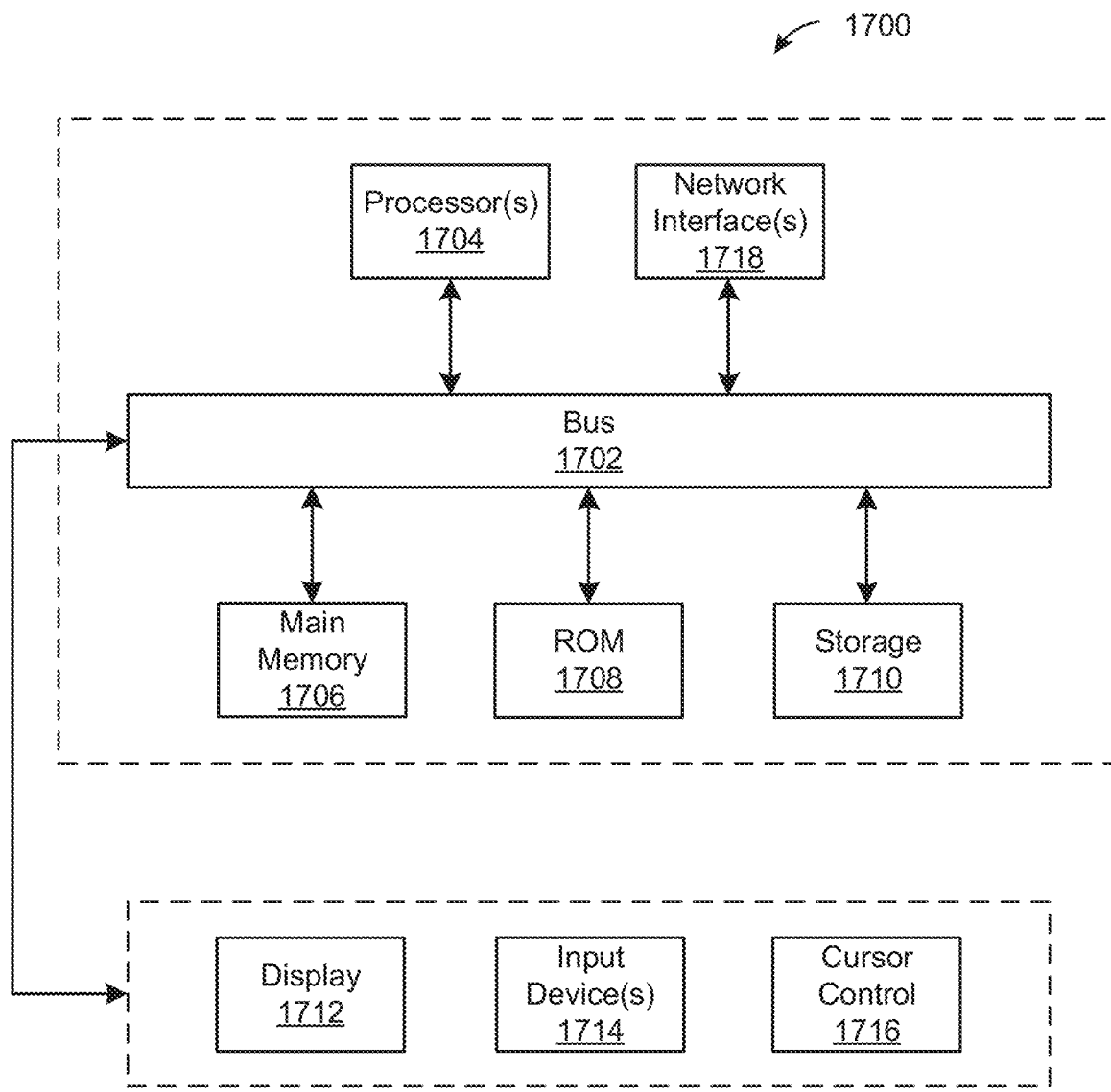
FIG. 17 illustrates a block diagram of a computer system upon which any of the embodiments described herein may be implemented.

FIG. 17 illustrates a block diagram of a computer system 1700 upon which any of the embodiments described herein may be implemented. The computer system 1700 includes a bus 1702 or other communication mechanism for communicating information, one or more hardware processors 1704 coupled with bus 1702 for processing information. A description that a device performs a task is intended to mean that one or more of the hardware processor(s) 1704 performs.

The computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions.

The computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions.

The computer system 1700 may be coupled via bus 1702 to output device(s) 1712, such as a cathode ray tube (CRT) or LCD display (or touch screen), for displaying information to a computer user. Input device(s) 1714, including alphanumeric and other keys, are coupled to bus 1702 for communicating information and command selections to processor 1704. Another type of user input device is cursor control 1716. The computer system 1700 also includes a communication interface 1718 coupled to bus 1702.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A system configured to train a model to infer an intent of an entity, comprising:
one or more sensors configured to obtain frames of data;
one or more processors; and:
a memory storing instructions that, when executed by the one or more processors, cause the system to perform:
determining, in each frame of the frames, one or more bounding regions, each of the bounding regions enclosing an entity;
across the frames, identifying a common entity, the common entity being present in bounding regions corresponding to a plurality of the frames;
associating the common entity across the frames;
training a model to infer an intent associated with the common entity based on data outside of the bounding regions.

2. The system of claim 1, wherein the training the model is based on an output generated from an other model.

3. The system of claim 2, wherein the output generated from the other model comprises a segmentation output.

4. The system of claim 3, wherein the segmentation output comprises a semantic segmentation output or an instance segmentation output.

5. The system of claim 4, wherein the segmentation output comprises a semantic segmentation output that trains the model to predict a category or classification associated with one or more pixels of the frames.

6. The system of claim 5, wherein the segmentation output comprises an instance segmentation output that trains the model to predict whether two pixels associated with a common category or classification belong to same or different instances.

7. The system of claim 2, wherein the output generated from the other model comprises Lidar data.

8. The system of claim 2, wherein the instructions further cause the system to perform:
rescaling the output generated from the other model to fit dimensions of the bounding regions.

9. The system of claim 1, wherein:
the one or more sensors comprise a camera;
the entity comprises a vehicle; and
the intent is associated with a turning or braking maneuver of the vehicle.

10. The system of claim 9, wherein the intent is associated with a left or right turn signal.

11. The system of claim 9, wherein the training comprises training the model to determine a probability of a left turn signal of the vehicle being on, a probability of a right turn signal of the vehicle being on, and a probability of a brake light being on intent is associated with a left or right turn signal.

12. The system of claim 9, wherein the training is based on cross entropy losses over the inferred intent, over left or right turn signals of the vehicle, and over the vehicle.

13. The system of claim 1, wherein the training comprises training the model to infer the intent under different weather and lighting conditions.

14. The system of claim 1, wherein the training is based on a classification loss, a bounding box loss, and a mask prediction loss.

15. The system of claim 1, wherein the model comprises a softmax layer that determines probabilities that each pixel of the frames belongs to a particular classification or category.

16. A system configured to infer an intent of an entity, comprising:
   one or more sensors configured to obtain frames of data;
   one or more processors; and
   a memory storing instructions that, when executed by the one or more processors, cause the system to perform:
      determining, in each frame of the frames, one or more bounding regions, each of the bounding regions enclosing an entity;
      across the frames, identifying a common entity, the common entity being present in bounding regions corresponding to a plurality of the frames;
      associating the common entity across the frames;
      inferring, using a trained model, an intent associated with the common entity based on data outside of the bounding regions.

17. The system of claim 16, wherein:
   the one or more sensors comprise a camera; and
   the instructions further cause the system to perform:
      determining a probability associated with the inferred intent; and
      in response to the probability being within a threshold range, supplementing the obtained frames with Lidar data.

18. The system of claim 16, wherein the inferring an intent of the common entity further comprises:
   categorizing or classifying one or more pixels of the frames in a semantic segmentation process;
   out of the one or more pixels, determining second pixels having a common category or classification with one another;
   of the second pixels having the common category or classification, determining whether two of the second pixels belong to same or different instances in an instance segmentation process; and
   inferring the intent based on the semantic segmentation process and the instance segmentation process.

19. The system of claim 16, wherein:
   the one or more sensors comprise a camera;
   the entity comprises a vehicle; and
   the intent is associated with a turning or braking maneuver of the vehicle.

20. The system of claim 19, wherein the inferring the intent comprises determining a probability of a left turn signal of the vehicle being on, a probability of a right turn signal of the vehicle being on, and a probability of a brake light being on.

* * * * *